US012200439B2

(12) United States Patent
Tsuchiya

(10) Patent No.: US 12,200,439 B2
(45) Date of Patent: Jan. 14, 2025

(54) ACOUSTIC PROCESSING DEVICE, ACOUSTIC PROCESSING METHOD, CONTROL METHOD, AND PROGRAM

(71) Applicant: Sony Group Corporation, Tokyo (JP)

(72) Inventor: Shinpei Tsuchiya, Saitama (JP)

(73) Assignee: Sony Group Corporation, Tokyo (JP)

( * ) Notice: Subject to any disclaimer, the term of this patent is extended or adjusted under 35 U.S.C. 154(b) by 168 days.

(21) Appl. No.: 17/919,722

(22) PCT Filed: Apr. 6, 2021

(86) PCT No.: PCT/JP2021/014670
§ 371 (c)(1),
(2) Date: Oct. 18, 2022

(87) PCT Pub. No.: WO2021/215242
PCT Pub. Date: Oct. 28, 2021

(65) Prior Publication Data

US 2023/0179914 A1 Jun. 8, 2023

(30) Foreign Application Priority Data

Apr. 25, 2020 (JP) ................................ 2020-077860

(51) Int. Cl.
*H04R 1/40* (2006.01)
*H04R 1/10* (2006.01)
*H04R 3/00* (2006.01)

(52) U.S. Cl.
CPC ........... *H04R 1/406* (2013.01); *H04R 1/1083* (2013.01); *H04R 3/005* (2013.01); *H04R 2203/12* (2013.01); *H04R 2499/11* (2013.01)

(58) Field of Classification Search
CPC ........... G10K 11/178; G10K 11/17823; G10K 11/17857; G10K 11/17881;
(Continued)

(56) References Cited

U.S. PATENT DOCUMENTS

2008/0247560 A1* 10/2008 Fukuda ........... G10K 11/17885 381/71.6
2010/0054492 A1* 3/2010 Eaton ....................... H04R 3/12 381/74
(Continued)

FOREIGN PATENT DOCUMENTS

JP 2008-193421 A 8/2008
JP 2009-021826 A 1/2009
JP 2012-063483 A 3/2012

OTHER PUBLICATIONS

International Search Report and English translation thereof mailed Jun. 22, 2021 in connection with International Application No. PCT/JP2021/014670.

*Primary Examiner* — Harry S Hong
(74) *Attorney, Agent, or Firm* — Wolf, Greenfield & Sacks, P.C.

(57) ABSTRACT

An acoustic processing device includes a first signal processing unit that generates a positive signal to be supplied to a positive electrode terminal of a first speaker and a positive electrode terminal of a second speaker, by using input audio signals from a first group of microphones, and a second signal processing unit that generates a negative signal to be supplied to a negative electrode terminal of the first speaker and a negative electrode terminal of the second speaker, by using input audio signals from a second group of microphones.

17 Claims, 16 Drawing Sheets

(58) Field of Classification Search
CPC ..... G10K 11/17885; G10K 2210/1081; G10K 2210/3215; G10K 2210/3219; H04R 1/10; H04R 1/1083; H04R 1/40; H04R 1/406; H04R 3/00; H04R 3/005; H04R 5/027; H04R 2203/12; H04R 2460/01; H04R 2499/11
USPC ............................ 381/74, 122, 370, 374, 375
See application file for complete search history.

(56) References Cited

U.S. PATENT DOCUMENTS

2012/0063611 A1 3/2012 Kimura
2014/0169601 A1 * 6/2014 Pedersen ................ H04R 25/48
381/316

* cited by examiner

A

B

THIRD EMBODIMENT

FIFTH EMBODIMENT

SIXTH EMBODIMENT

SEVENTH EMBODIMENT

EIGHTH EMBODIMENT

ACOUSTIC PROCESSING DEVICE, ACOUSTIC PROCESSING METHOD, CONTROL METHOD, AND PROGRAM

CROSS-REFERENCE TO RELATED APPLICATIONS

This application claims the benefit under 35 U.S.C. § 371 as a U.S. National Stage Entry of International Application No. PCT/JP2021/014670, filed in the Japanese Patent Office as a Receiving Office on Apr. 6, 2021, which claims priority to Japanese Patent Application Number 2020-077860, filed in the Japanese Patent Office on Apr. 25, 2020, each of which is hereby incorporated by reference in its entirety.

TECHNICAL FIELD

The present technology relates to an acoustic processing device, an acoustic processing method, a control method, and a program, and relates to, for example, a technology suited for a system of headphones and earphones or the like.

BACKGROUND ART

Some types of acoustic output devices available in recent years, such as headphones and earphones, have sophisticated additional functions such as a wireless communication function, a noise-cancelling function, and a beam forming function.

PTL 1 described below discloses a technology relating to a noise-cancelling system that can be incorporated in an acoustic output device.

CITATION LIST

Patent Literature

PTL 1

JP 2008-193421A

SUMMARY

Technical Problem

Meanwhile, as various types of functions are implemented, an acoustic output device such as headphones available in a current situation is provided with a processor for acoustic signal processing or for control, such as a CPU (Central Processing Unit) and a DSP (Digital Signal Processor), or provided with a transmitting/receiving unit for near-field wireless communication such as Bluetooth (registered trademark). However, required operations are not necessarily performed in an appropriate manner, and wasteful power is also often consumed.

Accordingly, the present technology proposes such a technology capable of executing more accurate processing in a configuration including multiple signal processing units, for example.

Solution to Problem

An acoustic processing device according to the present technology includes a first signal processing unit that generates a positive signal to be supplied to a positive electrode terminal of a first speaker and a positive electrode terminal of a second speaker, by using input audio signals from a first group of microphones, and a second signal processing unit that generates a negative signal to be supplied to a negative electrode terminal of the first speaker and a negative electrode terminal of the second speaker, by using input audio signals from a second group of microphones.

Such an acoustic processing device performs signal processing applicable to a device or a system including multiple speakers (drivers), such as headphones, earphones, and a speaker system.

In the acoustic processing device according to the present technology described above, it is conceivable that switching between a state where the negative signal is supplied to the negative electrode terminal of the first speaker and the negative electrode terminal of the second speaker and a state where the negative electrode terminal of the first speaker and the negative electrode terminal of the second speaker are connected to the ground is enabled. When the negative electrode terminals are connected to the ground, each of the first and second speakers comes into such a state as to perform acoustic output on the basis of the positive signal to be supplied to the positive electrode terminal.

In the acoustic processing device according to the present technology described above, it is conceivable that switching between a state where the negative signal is supplied to the negative electrode terminal of the first speaker and the negative electrode terminal of the second speaker and a state where the negative electrode terminal of the first speaker and the negative electrode terminal of the second speaker are connected to the ground is enabled, and the acoustic processing device includes a control unit that controls the switching.

The control unit includes a processor (arithmetic processing device), for example, and performs control for switching between the state where the negative signal is supplied to the negative electrode terminals and the state where the negative electrode terminals are connected to the ground, according to a predetermined switching determination.

In the acoustic processing device according to the present technology described above, it is conceivable that the control unit controls the second signal processing unit to power it off in a case where the negative electrode terminal of the first speaker and the negative electrode terminal of the second speaker are connected to the ground.

Specifically, in a case where the negative signal need not be generated, the second signal processing unit is controlled to be powered off. The power-off state may be either a complete power-off state or a state where power supply for main processing is cut off, such as a sleep state of the second signal processing unit.

In the acoustic processing device according to the present technology described above, it is conceivable that the control unit receives, as input, the input audio signals from the first group of microphones through the first signal processing unit, analyzes the audio signals, and controls the second signal processing unit according to an analysis result.

For example, the control of the second signal processing unit is assumed to include control for switching between supply of the negative signal to the negative electrode terminals and ground connection with the negative electrode terminals, control for powering on or off the second signal processing unit, or the like.

In the acoustic processing device according to the present technology described above, it is conceivable that the control unit controls the second signal processing unit on the basis of information acquired through communication with an external device.

In this case, the control of the second signal processing unit is similarly assumed to include control for switching between supply of the negative signal to the negative electrode terminals and ground connection with the negative electrode terminals, control for powering on or off the second signal processing unit, or the like. For example, the external device is assumed to be a portable terminal device, a remote operation device, or the like.

In the acoustic processing device according to the present technology described above, it is conceivable that the first signal processing unit includes a first acoustic signal generation unit that generates a first positive signal to be supplied to the positive electrode terminal of the first speaker and a second acoustic signal generation unit that generates a second positive signal to be supplied to the positive electrode terminal of the second speaker, and that the second signal processing unit includes a third acoustic signal generation unit that generates a first negative signal to be supplied to the negative electrode terminal of the first speaker and a fourth acoustic signal generation unit that generates a second negative signal to be supplied to the negative electrode terminal of the second speaker.

Specifically, in the first signal processing unit, the first and second acoustic signal generation units generate respective positive signals for the first and second speakers. Similarly, in the second signal processing unit, the third and fourth acoustic signal generation units generate respective negative signals for the first and second speakers.

In the acoustic processing device according to the present technology described above, it is conceivable that one of or both the first signal processing unit and the second signal processing unit include an acoustic signal generation unit that generates a noise-cancelling signal.

In this configuration, the noise-cancelling signal is generated as one of or both the positive signal and the negative signal and supplied to the first and second speakers.

In the acoustic processing device according to the present technology described above, it is conceivable that either one of or both the first signal processing unit and the second signal processing unit include an acoustic signal generation unit that generates a beam forming signal.

In this configuration, the beam forming signal is generated as one of or both the positive signal and the negative signal and supplied to the first and second speakers.

In the acoustic processing device according to the present technology described above, it is conceivable that the positive signal generated by the first signal processing unit is a signal obtained by synthesizing an acoustic signal generated by an acoustic signal generation unit of the first signal processing unit, with an acoustic signal input to the first signal processing unit.

For example, the acoustic signal generation unit generates the noise-cancelling signal or the beam forming signal and also synthesizes the generated signal with the input acoustic signal of music or the like to generate the positive signal.

In the acoustic processing device according to the present technology described above, it is conceivable that the positive signal generated by the first signal processing unit and the negative signal generated by the second signal processing unit contain signal components having an identical acoustic function.

For example, the function includes various types of acoustic functions, such as a noise-cancelling function, an external-sound emphasis function, a particular-frequency emphasis function, a voice emphasis function by beam forming, and a function of emphasizing a sound travelling from a particular direction. It is assumed that the first and second signal processing units are configured to generate signals having the same function.

In the acoustic processing device according to the present technology described above, it is conceivable that either the positive signal generated by the first signal processing unit or the negative signal generated by the second signal processing unit contains a signal component for a particular acoustic function.

Assumed is such a configuration where only one of the first and second signal processing units generates a signal having a certain function.

It is conceivable that the acoustic processing device according to the present technology described above includes the first speaker and the second speaker.

For example, assumed is such a configuration example where the first signal processing unit and the second signal processing unit are built in stereo headphones, stereo earphones, or the like including a speaker.

It is conceivable that the acoustic processing device according to the present technology described above includes the first group of microphones and the second group of microphones.

For example, provided is a configuration which includes a microphone for collecting external sounds to generate a noise-cancelling signal or a beam forming signal.

A control method according to the present technology is a control method performed by an information processing device capable of communicating with the acoustic processing device described above. The control method includes a status determination process and a transmission process of transmitting a signal for controlling the second signal processing unit to the acoustic processing device, on the basis of a result of the status determination process.

For example, the control of the second signal processing unit is assumed to include control for switching between supply of the negative signal to the negative electrode terminals and ground connection with the negative electrode terminals, control for powering on or off the second signal processing unit, or the like. For example, such control is performed by the information processing device such as a portable terminal.

The status determination process is assumed to be a process of determining a peripheral environment status, a noise status, a current-position status, a status of the acoustic processing device, a user status, or the like.

A program according to the present technology is a program for causing an information processing device to execute such control method described above. With this program, the information processing device that executes the control method can be constructed.

DESCRIPTION OF EMBODIMENTS

Embodiments will hereinafter be described in the following order.

<1. Example of acoustic output device>

<2. First and second embodiments>

<3. Example of application to NC processing>

(3-1: Comparison example)

(3-2: Third embodiment)

(3-3: Fourth embodiment)

(3-4: Fifth embodiment)

<4. Application to BF processing and NC processing: sixth embodiment>

<5. Application to left-right separation type earphones: seventh embodiment>

<6. Linkage with external device: eighth embodiment>

<7. Summary and modifications>

1. Example of Acoustic Output Device

Figure 1:
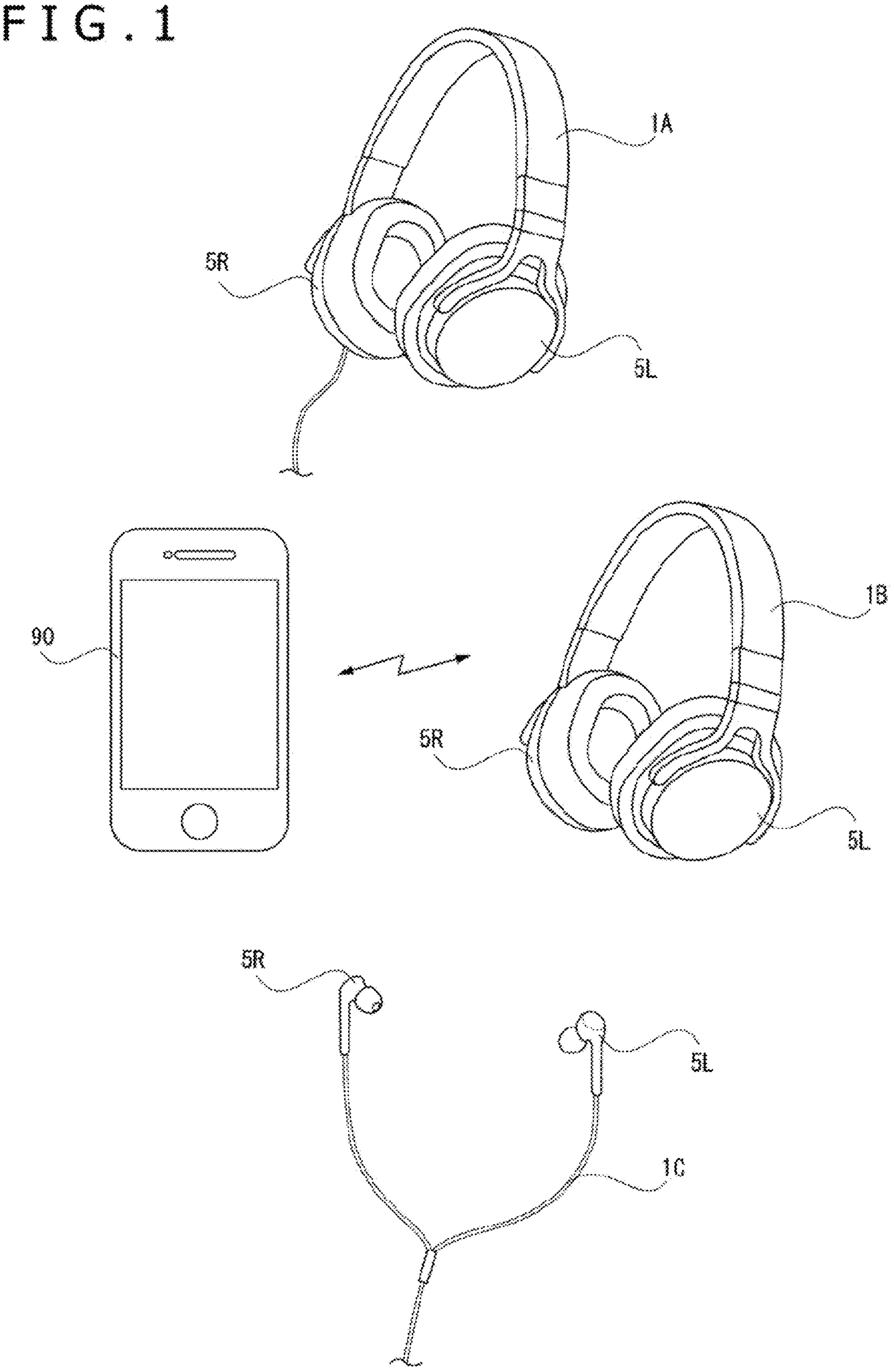
FIG. 1 is an explanatory diagram of an example of an acoustic output device according to an embodiment of the present technology.
Figure 2:
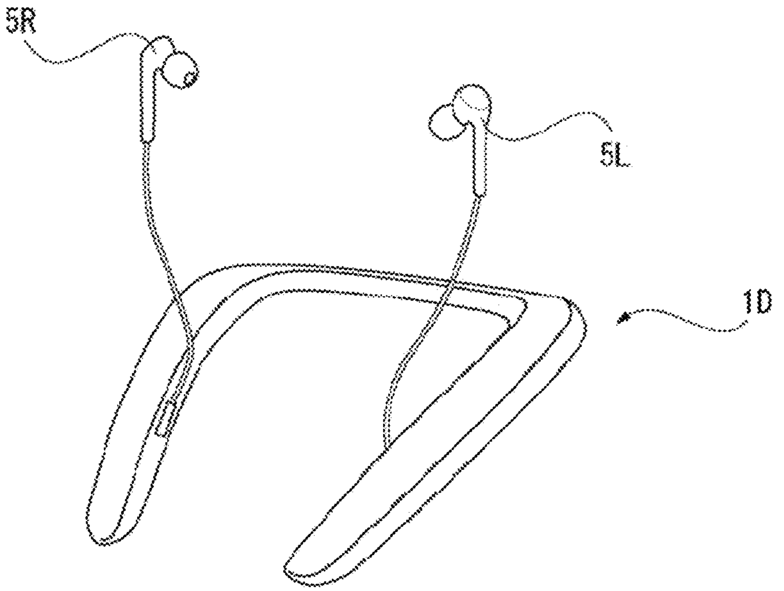
FIG. 2 depicts explanatory diagrams of an example of the acoustic output device according to the embodiment.
Figure 2:
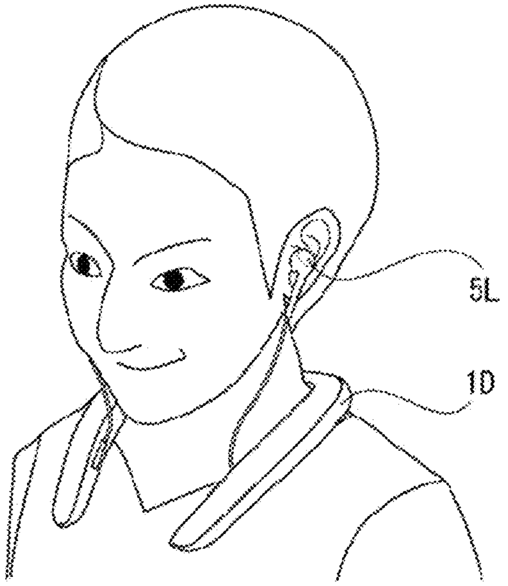

FIGS. 1 and 2 each depict an example of an acoustic processing device of the present technology that can be realized in an embodiment.

For example, the acoustic processing device is offered as an acoustic output device 1 itself depicted in FIGS. 1 and 2, or offered as an acoustic processing circuit, an acoustic processing unit, or the like built in or detachably attached to the acoustic output device 1.

FIG. 1 depicts overhead-type headphones 1A and 1B and canal-shaped earphones 1C as examples of the acoustic output device 1. In addition, FIG. 2A depicts neckband earphones 1D.

Each pair of the headphones 1A and 1B and earphones 1C and 1D has a left housing 5L corresponding to a left ear and a right housing 5R corresponding to a right ear. The left housing 5L and the right housing 5R are, for example, housings in earpad portions of the overhead-type headphones or housings in earhole insertion portions of the earphones or in the vicinity of the earhole insertion portions.

When a headband of the headphones 1A or 1B is worn on a head portion of a user, the left housing 5L and the right housing 5R are located to cover the left ear and the right ear of the user, respectively. When the user wears the earphones 1C or 1D, a part of the left housing 5L and a part of the right housing 5R are inserted into a left earhole and a right earhole of the user, respectively. Note that, when the neckband earphones 1D are used, it is assumed that the left housing 5L and the right housing 5R are inserted into the left earhole and the right earhole of the user, respectively, in a state where a neckband portion of the earphones is hung on the neck of the user as depicted in FIG. 2B.

The left housing 5L and the right housing 5R herein are physically connected to each other by a headband, a cord, a neckband, or the like, and wiring for transferring acoustic signals or the like can be formed inside such a connecting part.

Note that the headphones 1B are an example of a device capable of wireless communication with a terminal device 90 such as a smartphone. For example, the headphones 1B can reproduce music by using acoustic signals of the music or the like transmitted from the terminal device 90. Moreover, wireless transfer of various types of control signals may be performed.

The headphones 1A and 1B and the earphones 1C and 1D depicted in FIGS. 1 and 2 are presented only by way of example. Alternatively, the acoustic output device 1 may be inner-ear-type earphones, a two-channel or three- or more channel speaker system, or the like.

Moreover, the acoustic processing device of the embodiment is not limited to the acoustic output device 1 such as headphones, earphones, and a speaker system described above and to a form of a unit built in or attached to the acoustic output device 1, and may be constructed as an acoustic processing device used separately from headphones, earphones, a speaker, or the like, for example.

It is preferable that the acoustic output device 1 (or acoustic processing device) of the embodiment have physically continuous portions such as the left housing 5L and the right housing 5R that perform acoustic output from respective channels, for example, from a left channel and a right channel, and that communicate with each other by a wire. Particularly, such an acoustic output device 1 (or acoustic processing device) is preferable in a case of implementing a noise-cancelling function or a beam forming function as described below in third to sixth embodiments.

However, depending on functions of the device, the left housing 5L and the right housing 5R may not physically be continuous and may communicate with each other wirelessly, for example. For example, in a case where the device has such a function or a configuration that is not affected by an increase in processing load, a delay, or the like due to wireless communication, the left housing 5L and the right housing 5R may be configured to communicate with each other wirelessly, for example.

Moreover, as described below in a seventh embodiment, the technology of the present disclosure is applicable to left-right separation type earphones (headphones).

2. First and Second Embodiments

Detailed configurations of embodiments will hereinbelow be described assuming that the acoustic output device 1 such as the headphones 1A and 1B or the earphones 1C and 1D is used.

Figure 3:
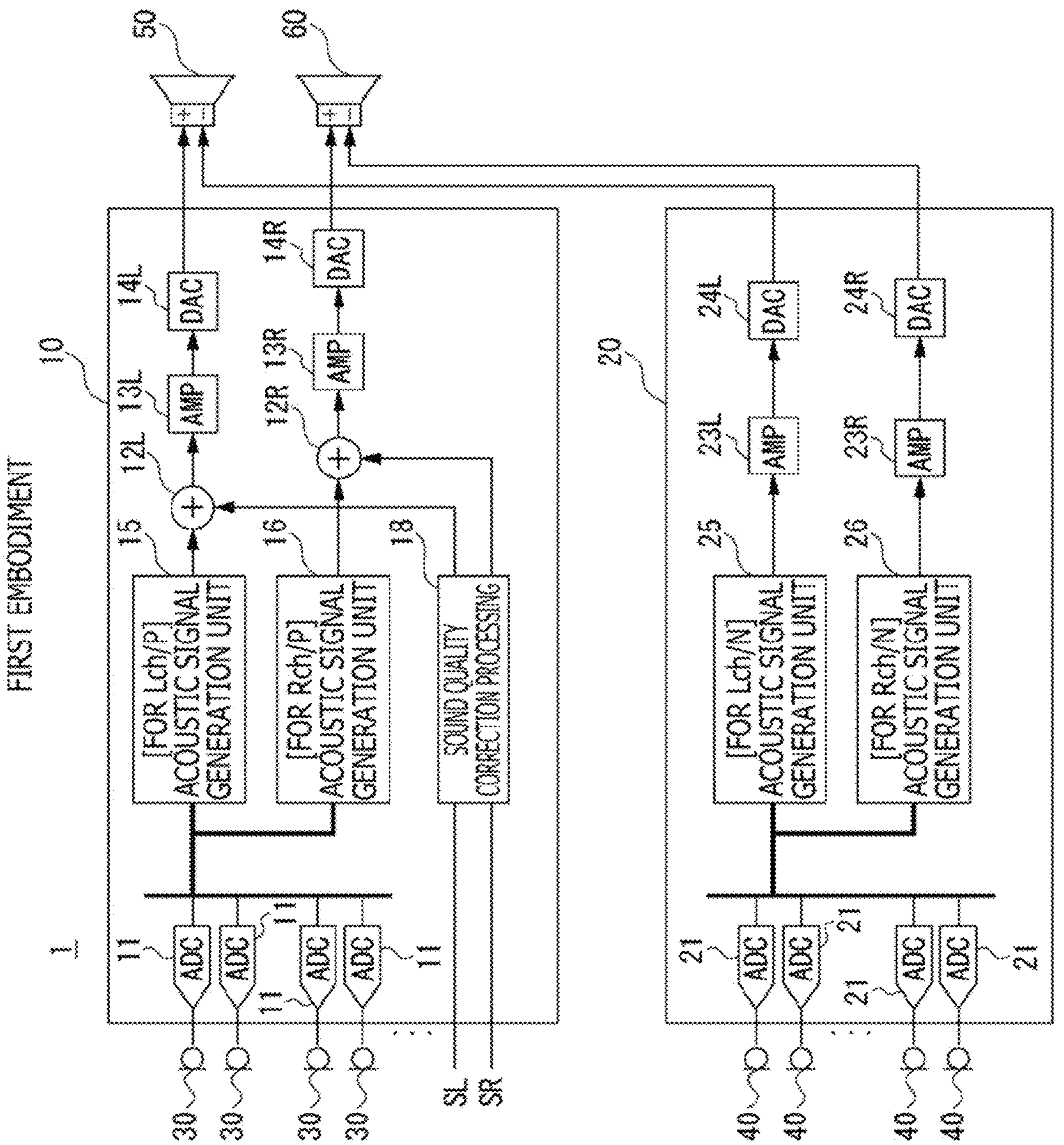
FIG. 3 is a block diagram of an acoustic processing device according to a first embodiment.

FIG. 3 depicts a configuration of the acoustic output device 1 according to a first embodiment.

The acoustic output device 1 includes signal processing units 10 and 20. Each of the signal processing units 10 and 20 is configured as an LSI chip or the like, specifically, a chip containing a processor (arithmetic processing device) such as a CPU and a DSP or containing a processor and a peripheral circuit.

The signal processing units 10 and 20 may be disposed on the left housing 5L and the right housing 5R of the acoustic output device 1, respectively, or may both be accommodated in the left housing 5L or in the right housing 5R.

The signal processing unit 10 includes multiple microphones 30, multiple A/D converters (hereinafter each expressed as an "ADC") 11 each associated with the corresponding one of the multiple microphones 30, acoustic signal generation units 15 and 16, adders 12L and 12R, power amplifiers 13L and 13R, D/A converters (hereinafter each expressed as a "DAC") 14L and 14R, and a sound quality correction processing unit 18.

Note that, in FIG. 3, the microphones 30 are each assumed to have a microphone amplifier for audio signals obtained by sound collection. However, for example, a microphone amplifier may separately be provided in a stage before the ADC 11. This is similarly applied to microphones 40 described below and microphones depicted in other figures.

The signal processing unit 20 includes multiple microphones 40, multiple ADCs 21 each associated with the corresponding one of the multiple microphones 30, acoustic signal generation units 25 and 26, power amplifiers 23L and 23R, and DACs 24L and 24R.

The multiple microphones 30 are all provided on the left housing 5L in some cases, or all provided on the right housing 5R in other cases. Alternatively, some of the multiple microphones 30 are provided on the left housing 5L, and the other microphones 30 are provided on the right housing 5R, in some cases.

Similarly, the multiple microphones 40 are all provided on the left housing 5L in some cases, or all provided on the right housing 5R in other cases. Alternatively, some of the multiple microphones 40 are provided on the left housing 5L, and the other microphones 40 are provided on the right housing 5R, in some cases.

Accordingly, for example, both the microphones 30 and 40 are provided on the left housing 5L or the right housing 5R in some cases.

Note that it is also conceivable that the microphones 30 and 40 are provided separately from the acoustic output device 1 and transmit audio signals obtained by sound collection to the signal processing units 10 and 20 by wireless communication.

It is assumed that the microphones 30 and 40 thus configured collect sounds in a peripheral environment, for example. Specifically, the microphones 30 and 40 are provided to implement such functions as noise cancellation or beam formation.

For example, speakers 50 and 60 are speakers corresponding to an L channel and an R channel. The speaker 50 is disposed on the left housing 5L, while the speaker 60 is disposed on the right housing 5R. In this manner, acoustic output to the left and right ears of the user is performed.

In the present embodiment, an example of an L/R stereo acoustic output device with an L (left) channel and an R (right) channel will be described. However, it does not mean that the signal processing units 10 and 20 correspond to the L channel or the R channel, respectively. In other words, there is not necessarily a one-to-one correspondence between the signal processing units 10 and 20 and the channels.

The signal processing unit 10 has a function of generating positive signals to be supplied to respective positive electrode terminals (also called+terminals or positive terminals) of the speakers 50 and 60. In other words, the signal processing unit 10 is a positive signal generation device.

The signal processing unit 20 has a function of generating negative signals to be supplied to respective negative electrode terminals (also called-terminals or negative terminals) of the speakers 50 and 60. In other words, the signal processing unit 20 is a negative signal generation device.

Note that the "positive signals" in the present disclosure refer to signals (or signal components) to be supplied to a positive terminal, and do not specify a signal type, e.g., which type of audio signals, and a phase relation with negative signals.

Similarly, the "negative signals" refer to signals (or signal components) to be supplied to a negative terminal, and do not specify a signal type, e.g., which type of audio signals, and a phase relation with positive signals.

In such a configuration, input audio signals transmitted from the microphones 30 are converted into digital signals by the ADCs 11 and input to the acoustic signal generation units 15 and 16.

In this example, the acoustic signal generation unit 15 generates an acoustic signal for the L channel and supplies the generated acoustic signal to the adder 12L. Moreover, the acoustic signal generation unit 16 generates an acoustic signal for the R channel and supplies the generated acoustic signal to the adder 12R.

An acoustic signal SL for the L channel and an acoustic signal SR for the R channel are input to the signal processing unit 10 from the outside. For example, it is assumed that each of the acoustic signals SL and SR includes music from a music source, a call voice, a broadcasting or communication sound, or the like (these will hereinafter be referred to as "music or the like").

The acoustic signals SL and SR are processed by the sound quality correction processing unit 18. For example, it is conceivable that processing such as equalizing, tone-control, sound volume adjustment, reverb-echo, special effects, e.g., pitch conversion, or noise reduction of the acoustic signals SL and SR themselves is performed.

The acoustic signals SL and SR that have been subjected to sound quality correction processing are supplied to the adders 12L and 12R, respectively.

The adder 12L synthesizes the acoustic signal generated by the acoustic signal generation unit 15, with the acoustic signal SL. Thereafter, output from the adder 12L is amplified by the power amplifier 13L, converted into an analog signal by the DAC 14L, and supplied to the positive electrode terminal of the speaker 50. In this manner, acoustic output from the L channel is executed on the basis of the positive signal.

The adder 12R synthesizes the acoustic signal generated by the acoustic signal generation unit 16, with the acoustic signal SR. Thereafter, output from the adder 12R is amplified by the power amplifier 13R, converted into an analog signal by the DAC 14R, and supplied to the positive electrode terminal of the speaker 60. In this manner, acoustic output from the L channel is executed on the basis of the positive signal.

Note that the "positive signal" in such a configuration may be regarded as an acoustic signal generated by the acoustic signal generation unit 15 or 16 (a "component" of the signal to be supplied to the positive electrode terminal), or may be regarded as an acoustic signal that has undergone the synthesis by the adder 12L or 12R (a signal "itself" to be supplied to the positive electrode terminal).

Meanwhile, audio signals of sounds collected by the microphones 40 are converted into digital signals by the ADCs 21 and input to the acoustic signal generation units 25 and 26.

In this example, the acoustic signal generation unit 25 generates an acoustic signal for the L channel and supplies the generated acoustic signal to the power amplifier 23L. Thereafter, the acoustic signal (negative signal) amplified by the power amplifier 23L is converted into an analog signal by the DAC 24L and supplied to the negative electrode terminal of the speaker 50. In this manner, acoustic output from the L channel is executed on the basis of the negative signal.

Moreover, the acoustic signal generation unit 26 generates an acoustic signal for the R channel and supplies the generated acoustic signal to the power amplifier 23R. Thereafter, the acoustic signal (negative signal) amplified by the power amplifier 23R is converted into an analog signal by the DAC 24R and supplied to the negative electrode terminal of the speaker 60. In this manner, acoustic output from the R channel is executed on the basis of the negative signal.

Note that the "negative signal" in such a configuration refers to an acoustic signal generated by the acoustic signal generation unit 25 or 26 (the signal "itself" to be supplied to the positive electrode terminal). However, it is also conceivable that the adder performs addition of another acoustic signal as with the configuration of the signal processing unit 10. In this case, the negative signal may be regarded as the signal "itself" to be supplied to the positive electrode terminal as an acoustic signal that has undergone the addition, or may be interpreted as a component of the signal that has undergone the addition (the acoustic signal generated by the acoustic signal generation unit 25 or 26).

In the case of the configuration depicted in FIG. 3, the acoustic signals SL and SR of music or the like are first supplied to the positive electrode terminals of the speakers 50 and 60. Accordingly, music or the like is normally reproduced.

In addition, acoustic output is performed on the basis of acoustic signals generated by the acoustic signal generation units 15, 16, 25, and 26.

It is conceivable that the acoustic signal generation units 15, 16, 25, and 26 perform various types of processing as follows.

- noise-cancelling signal generation processing
- external-sound emphasis signal generation processing
- particular-frequency emphasis signal generation processing
- voice emphasis signal processing by beam forming
- processing for emphasizing a sound travelling from a particular direction It is assumed that the acoustic signal generation units 15, 16, 25, and 26 function as units for performing some of or a combination of these items of processing.

For example, all of the acoustic signal generation units 15, 16, 25, and 26 may function as noise-cancelling signal generation processing units.

Alternatively, all of the acoustic signal generation units 15, 16, 25, and 26 may function as beam forming signal generation processing units.

In addition, the acoustic signal generation units 15 and 16 that generate positive signals may function as the noise-cancelling signal generation processing units, and the acoustic signal generation units 25 and 26 that generate negative signals may function as the beam forming signal generation processing units, so that positive signals and negative signals may have functions different from each other.

Further, the acoustic signal generation units 15 and 25 that generate positive signals and negative signals to be supplied to the speaker 50 for the L channel may perform the same type of signal generation processing among pieces of the above processing, while the acoustic signal generation units 16 and 26 that generate positive signals and negative signals to be supplied to the speaker 50 for the R channel may perform the same type of signal generation processing among pieces of the above processing (but different from the processing for the L channel).

Moreover, all of the acoustic signal generation units 15, 16, 25, and 26 may function as units for performing a different type of signal generation processing among pieces of the above processing.

Besides, each of the acoustic signal generation units 15, 16, 25, and 26 may perform multiple types of signal generation processing among pieces of the above processing. For example, the acoustic signal generation unit may generate signals for emphasizing a sound travelling from a particular direction and for emphasizing a particular frequency, or generate a noise-cancelling signal and a beam forming signal.

Needless to say, signal processing performed by the acoustic signal generation units 15, 16, 25, and 26 is not limited to the above processing, and various types of processing can be performed by the acoustic signal generation units 15, 16, 25, and 26.

In any case, both or one of the signal processing units 10 and 20 may operate. With positive signals and negative signals supplied from each of the signal processing unit 10 and 20 to the speakers 50 and 60, such signal output as to enhance the functions can be performed.

Herein, a configuration of a second embodiment in which some components are added to the configuration of FIG. 3 will be described with reference to FIG. 4.

Figure 4:
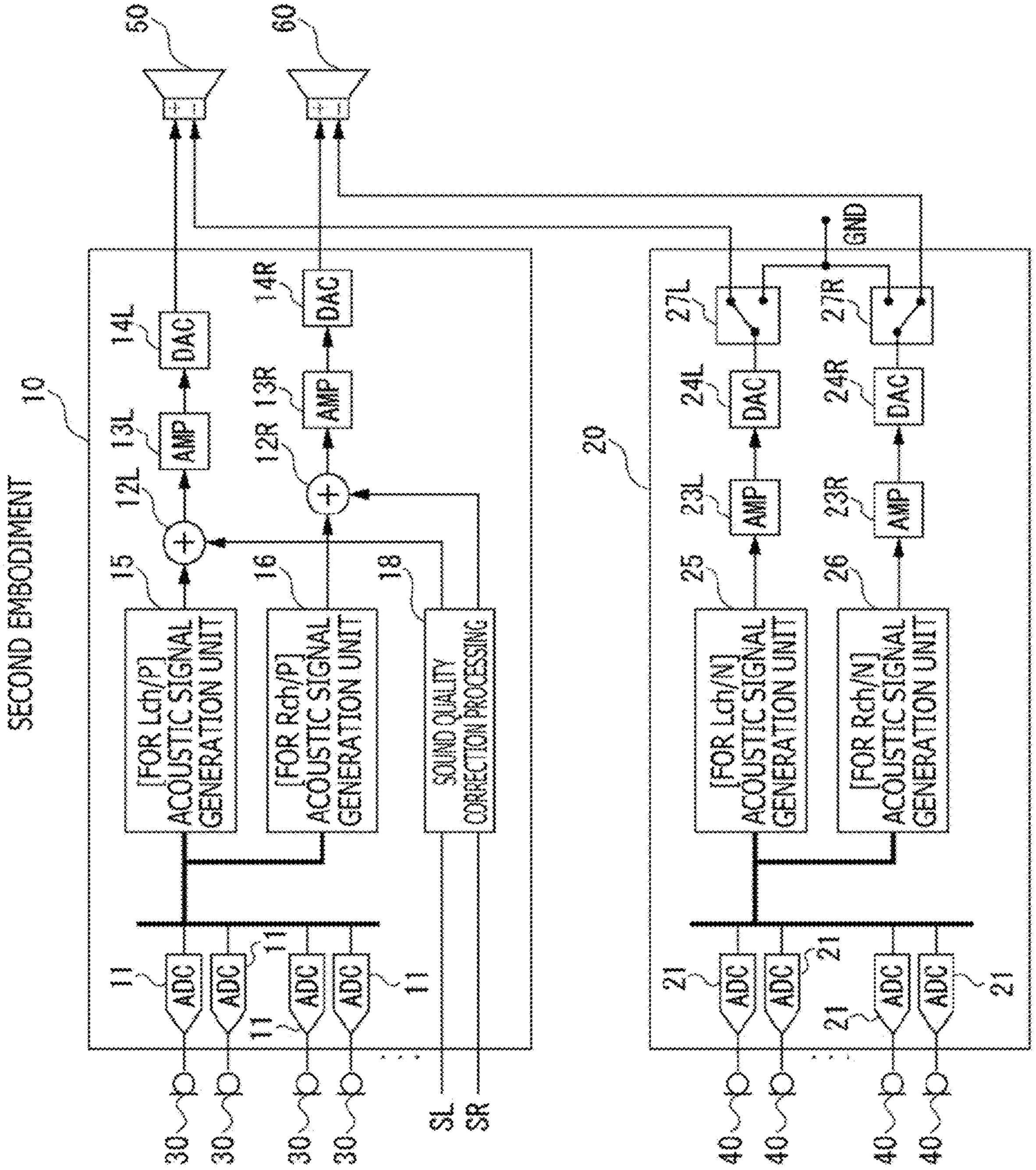
FIG. 4 is a block diagram of an acoustic processing device according to a second embodiment.

FIG. 4 is different from FIG. 3 only in that switch units 27L and 27R are included in the signal processing unit 20. Each of the switch units 27L and 27R is a switch for switching between a state where negative signals are supplied from the acoustic signal generation units 25 and 26 to the negative electrode terminals of the speakers 50 and 60 and a state where the negative electrode terminals of the speakers 50 and 60 are connected to the ground (GND).

When the negative electrode terminals of the speakers 50 and 60 are connected to the ground, the acoustic output device 1 comes into a state where acoustic reproduction is executable only by the signal processing unit 10. For example, music or the like is reproduced on the basis of the acoustic signals SL and SR, and acoustic signals generated by the acoustic signal generation units 15 and 16 are output. In this case, the signal processing unit 20 may be powered off.

On the other hand, in a state where negative signals are supplied from the acoustic signal generation units 25 and 26 to the negative electrode terminals of the speakers 50 and 60, the acoustic output device 1 has a configuration similar to the configuration of FIG. 3.

In other words, both the signal processing units 10 and 20 may operate, or only the signal processing unit 10 may operate. With positive signals and negative signals supplied from each of the signal processing unit 10 and 20 to the speakers 50 and 60, such signal output as to enhance the functions can be performed.

In addition, the signal processing unit 10 supplies acoustic signals (positive signals) to the positive electrode terminals of the speakers 50 and 60. Accordingly, stereo output is executable only by the signal processing unit 10. In other words, the signal processing unit 20 may be powered off and may not operate. The acoustic output device 1 can normally operate as a system for reproducing music or the like.

Note that the switch units 27L and 27R are included in an internal circuit of the signal processing unit 20 in FIG. 4 but may be included in a circuit outside of the signal processing unit 20.

Moreover, a switch unit which switches to a state where the positive electrode terminals of the speakers 50 and 60 are connected to ground may be provided, and while the signal processing unit 10 is powered off, only the signal processing unit 20 may operate to supply negative signals from the acoustic signal generation units 25 and 26 to the negative electrode terminals of the speakers 50 and 60. In this case, only the signal processing unit 20 can operate to perform stereo output of external sounds or the like.

3. Example of Application to NC Processing

3-1: Comparison Example

More specific examples applied to signal generation will be described in the third and following embodiments.

Note that "noise cancelling" will be expressed as "NC" in some cases in the description and the drawings of the present disclosure. Moreover, "beam forming" will be expressed as "BF" in some cases.

Further, the "signal processing unit" will hereinafter be expressed with a reference sign "10A," "10B," or "10C" according to its function or the like. In a case where the signal processing units are not distinguished from one another by their functions, they will collectively be referred to as the "signal processing unit 10." These expressions are similarly applicable to the "signal processing unit 20."

Moreover, different names are given to the acoustic signal generation units 15, 16, 25, and 26 according to their functions, and alphabets or numerals are added to the end of their reference signs (e.g., the "NC signal generation unit 15A"). In a case where the acoustic signal generation units are not distinguished from one another, they will collectively be referred to as the "acoustic signal generation unit 15" or the like, as with the case described in FIG. 3.

As for the microphone 30 and the microphone 40, alphabets" or numerals are also added to the end of their reference signs in some cases. In a case where the microphones are not distinguished from one another, they will collectively be referred to as the "microphone 30" or the "microphone 40."

The acoustic output device 1 having an NC function will be described in each of the third to sixth embodiments. First, brief description of an NC system will be given herein.

In a general NC system, there is known a configuration in which, from noise signals of sounds collected by a peripheral-noise collection microphone, NC signals in an opposite phase are generated in such a manner as to minimize a sound pressure near the ears of a user to cancel the noise.

Figure 5:
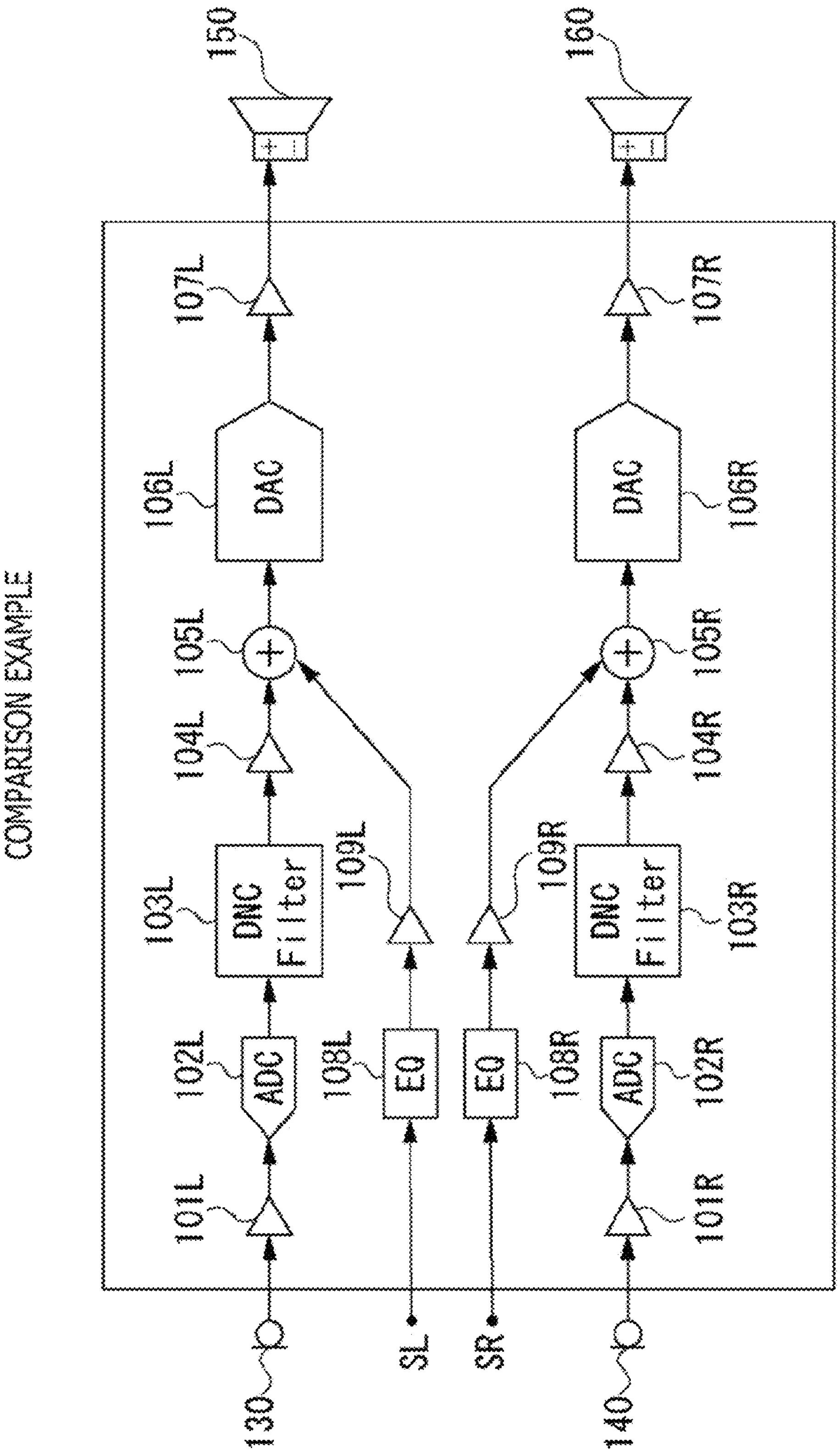
FIG. 5 is a block diagram of a configuration of noise-cancelling processing according to a comparison example.

FIG. 5 depicts a configuration example of the NC system.

A noise signal of a sound collected by a microphone 130 is input to a DNC (digital noise cancelling) filter 103L via a microphone amplifier 101L and an ADC 102L, and the DNC filter 103L generates an NC signal. The NC signal is supplied to an adder 105L via an amplifier 104L and synthesized with the acoustic signal SL of music or the like. Note that the acoustic signal SL is supplied to the adder 105L via an equalizer 106L and an amplifier 109L, for example. The output from the adder 105L resulting from the synthesis of the NC signal and the signal of the music or the like is converted into an analog signal by the DAC 106L, amplified by a power amplifier 107L, and supplied to a speaker 150 for an L channel. The speaker 150 performs acoustic output on the basis of the acoustic signal SL and the NC signal for the L channel.

Moreover, a noise signal of a sound collected by a microphone 140 is input to a DNC filter 103R via a microphone amplifier 101R and an ADC 102R, and the DNC filter 103R generates an NC signal. The NC signal is supplied to an adder 105R via an amplifier 104R and synthesized with the acoustic signal SR of music or the like. The acoustic signal SR is supplied to the adder 105R via an equalizer 106R and an amplifier 109R, for example. The output from the adder 105R resulting from the synthesis of the NC signal and the signal of the music or the like is converted into an analog signal by the DAC 106R, amplified by a power amplifier 107R, and supplied to the speaker 150 for an R channel. The speaker 150 performs acoustic output on the basis of the acoustic signal SR and the NC signal for the R channel.

With such a configuration, only a peripheral noise can be cancelled while a user is listening to music, for example.

In practice, an NC device is provided as an LSI circuit or a circuit device in a form capable of performing processing for two channels as described above.

Note that the microphone 130 and the microphone 140 in this configuration are respectively provided on, for example, the left housing 5L and the right housing 5R of the headphones 1A depicted in FIG. 1.

In other words, in this configuration in FIG. 5, an acoustic signal system is provided for each channel, and the acoustic signal systems are separated from each other. The DNC filter 103L is used for the L channel, and the DNC filter 103R is used for the R channel.

There is an idea of providing multiple microphones, as a method for further increasing a noise-cancelling effect in such an NC system described above.

In general, for each of the ears, one microphone is disposed outside the ear, and another microphone is disposed inside the ear. The outside microphone is used for feedforward NC, and the inside microphone is used for feedback NC, thereby increasing the performance. Therefore, some of the general NC devices each support four-channel microphone input and two-channel speaker output with the use of an LSI circuit for NC and for four-channel input, for example.

It is effective to further increase the number of microphones so as to further improve the NC performance. Therefore, it is also conceivable that an NC device for the left and an NC device for the right are used independently of each other.

Figure 6:
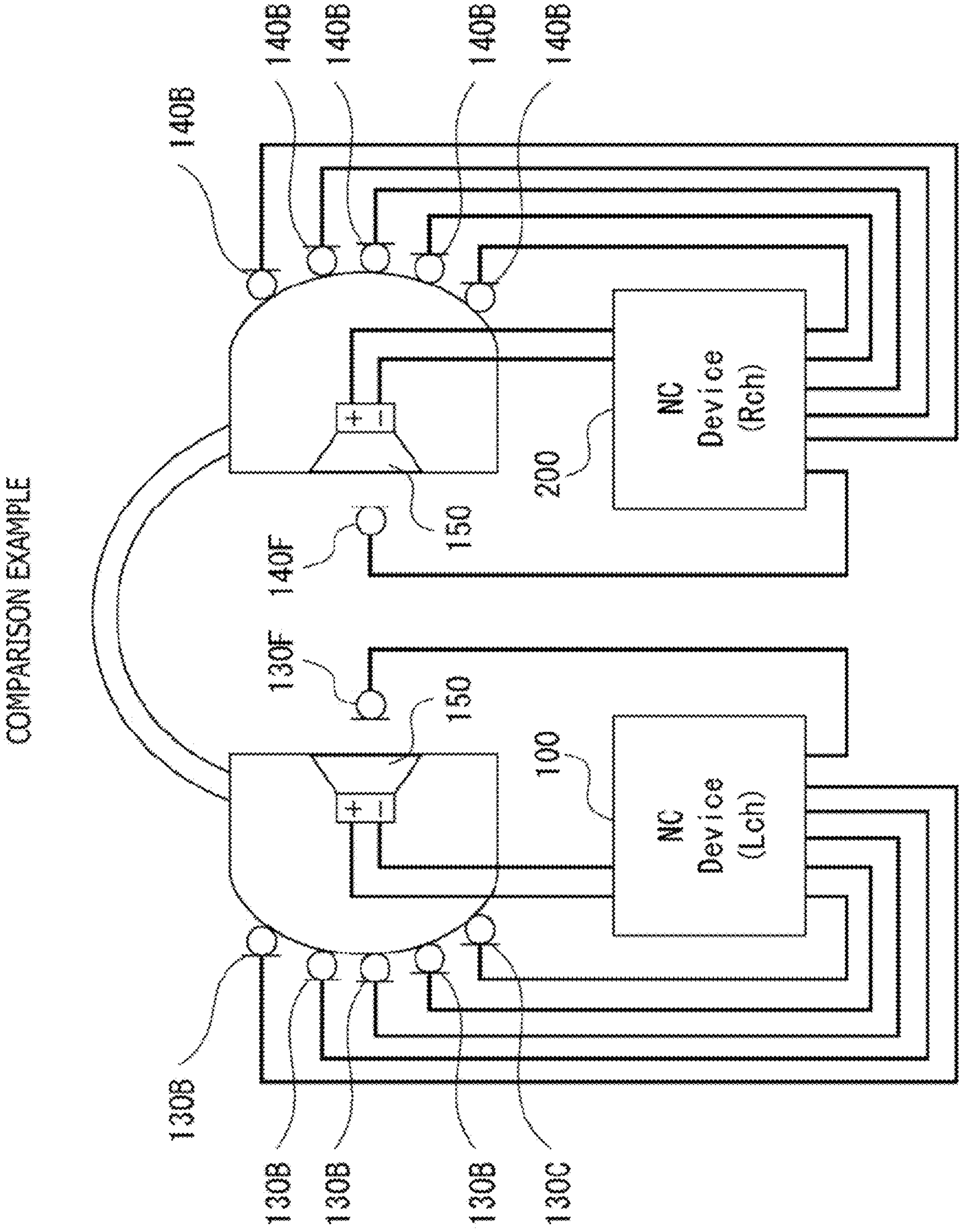
FIG. 6 is an explanatory diagram of a noise-cancelling system configuration according to a comparison example.

FIG. 6 depicts an example where an NC device 100 for the L channel and an NC device 200 for the R channel are used.

The NC device 100 accepts input from six microphones 130 in total, that is, a microphone 130F for FF (feedforward) and five microphones 130B for FB (feedback). The NC device 100 generates an NC signal on the basis of the input from the six microphones 130 described above and supplies the generated NC signal to the speaker 150.

Similarly, the NC device 200 accepts input from six microphones 140 in total, that is, a microphone 140F for FF and five microphones 140B for FB. The NC device 200 generates an NC signal on the basis of the input from the six microphones 140 described above and supplies the generated NC signal to a speaker 160.

Needless to say, in order to improve the NC performance, it is also conceivable that the number of microphones disposed on one channel is further increased. However, in a case where each of the NC devices 100 and 200 accepts input from six microphones, it is difficult to further increase the number of microphones. In this case, it is necessary to take such measures as changing the NC device to be mounted to an NC device which can accept input from a larger number of channels, or increasing the number of the NC devices to be mounted.

In the case of the configuration of FIG. 6 examined herein, multiple LSI circuits (NC devices 100 and 200) are constantly operated. Accordingly, power consumption increases, and a product operation time decreases.

In the case of FIG. 6, the NC devices 100 and 200 need to constantly operate at the same time for stereo reproduction.

Although not depicted in the figure, the NC device 100 for the L channel also performs processing for receiving, as input, the acoustic signal SL for the L channel. Some NC devices receive the acoustic signals SL and SR by near-field wireless communication such as Bluetooth depending on the situation. In this case, such an NC device may also include a wireless communication chip. However, each of the NC devices 100 and 200 need to constantly perform acoustic signal processing for a corresponding channel.

Even if the LSI circuits which are the NC devices 100 and 200 have a power consumption reduction function, LSI fixed power, power for peripheral circuits, and the like are consumed while the same two LSI circuits are operated.

For example, even when the NC processing is unnecessary in a quiet surrounding situation, the two LSI circuits need to be operated at the same time for music reproduction. In order to perform the same control on the L channel and the R channel such as sound volume control of the LSI circuits, the two LSI circuits are required to be controlled independently of each other by using a control bus such as I2C. For music reproduction, communication between devices is usually established by one serial transfer such as I2S from a host CPU. However, demultiplexing from the host CPU, separation into the L channel and the R channel, and connection to the respective LSI circuits are required.

Moreover, in a case where the microphone having the NC function is used together with a microphone for calls and where a microphone signal between the left and the right is transferred to the host CPU, for multiplexing into one I2S, two-system I2S is required.

In such a manner, to implement a stereo application using two LSI circuits as described above, the circuit scale is increased, leading to an increase in power.

3-2: Third Embodiment

In such a manner, in a case where an NC system is to be constructed in a stereo acoustic system and particularly where multiple LSI circuits are used to increase the number of microphones to thereby improve the performance, it is difficult to reduce an increase in power, i.e., power consumption.

On the other hand, in the configuration described in the first and second embodiments above, while both the signal processing units 10 and 20 operate to improve the performance, only one of the signal processing units 10 and 20 can handle stereo output as described above. An example where this configuration is applied to an NC system will be described in the third embodiment.

Note that parts identical to the parts that have been explained in the figures above will be given identical reference signs to avoid repetitive explanation in each of the following embodiments.

Figure 7:
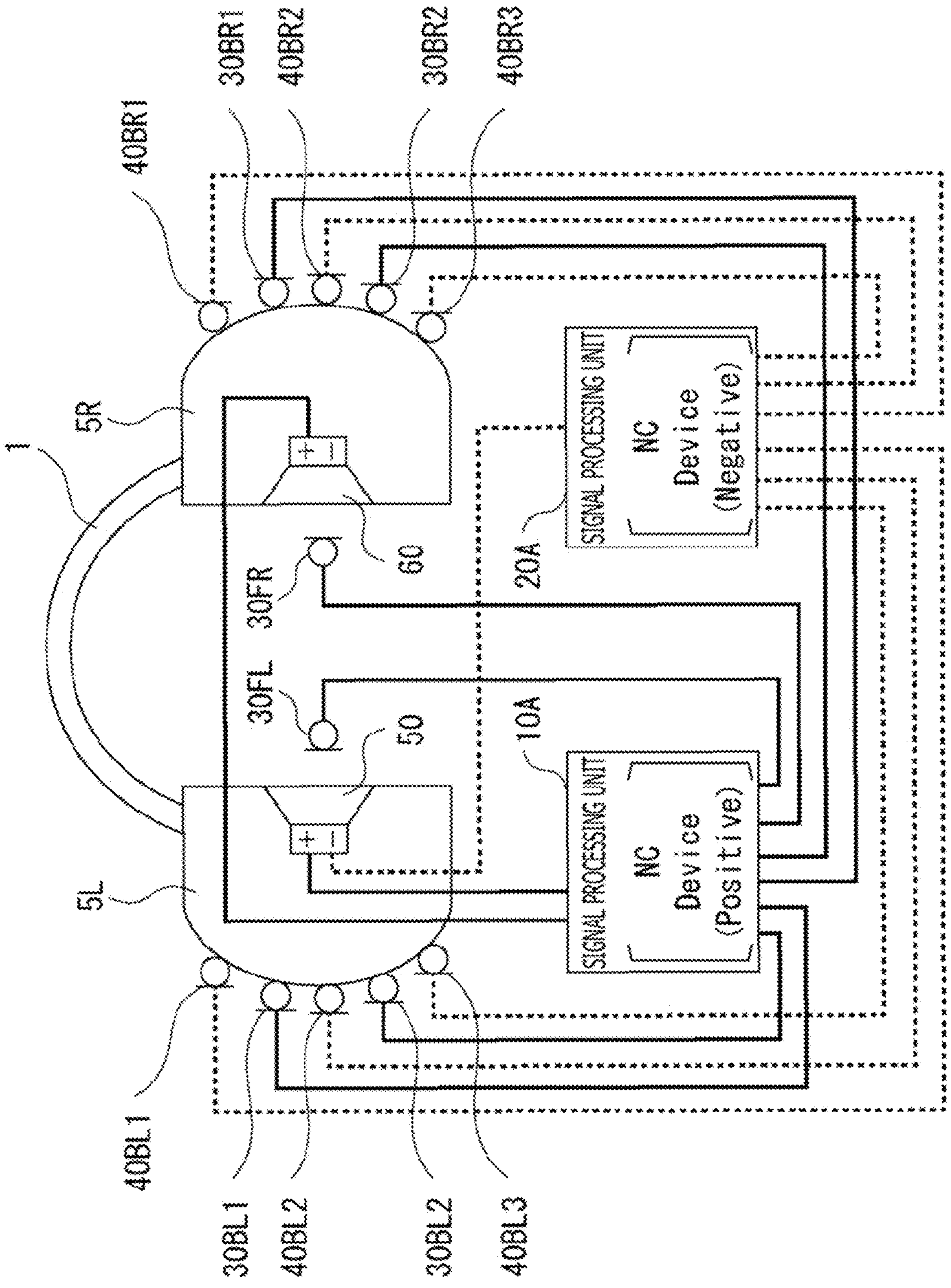
FIG. 7 is an explanatory diagram of a noise-cancelling system configuration according to a third embodiment.

FIG. 7 depicts a layout of the microphones 30 and 40 and a configuration example of signal processing units 10A and 20A.

The following six microphones in total are disposed as the microphones 30 and 40 on the left housing 5L of the acoustic output device 1.

microphone 30FL for L-channel FF
microphone 30BL1 for L-channel FB
microphone 30BL2 for L-channel FB
microphone 40BL1 for L-channel FB
microphone 40BL2 for L-channel FB
microphone 40BL3 for L-channel FB Moreover, the following six microphones in total are disposed as the microphones 30 and 40 on the right housing 5R.

microphone 30FR for R-channel FF
microphone 30BR1 for R-channel FB
microphone 30BR2 for R-channel FB
microphone 40BR1 for R-channel FB
microphone 40BR2 for R-channel FB
microphone 40BR3 for R-channel FB Note that it is preferable that the respective microphones 30 and 40 be disposed in such positions as to be bilaterally symmetrical for the purpose of capturing noises in a wide range for NC effects.

In FIG. 7, signal paths for generation or output of positive signals are indicated by solid lines, while signal paths for generation or output of negative signals are indicated by dotted lines.

Audio signals of sounds collected by microphones 30FL, 30BL1, 30BL2, 30FR, 30BR1, and 30BR2 are supplied to the signal processing unit 10A as indicated by solid lines.

Audio signals of sounds collected by microphones 40BL1, 40BL2, 40BL3, 40BR1, 40BR2, and 40BR3 are supplied to the signal processing unit 20A as indicated by dotted lines.

In this case, each of the signal processing units 10A and 20A serves as an NC device and generates NC signals.

In addition, the signal processing unit 10A supplies positive signals containing NC signal components based on the FF scheme and the FB scheme to the positive electrode terminals of the speakers 50 and 60.

Meanwhile, the signal processing unit 20A supplies negative signals corresponding to NC signals based on the FB scheme to the negative electrode terminals of the speakers 50 and 60.

Figure 8:
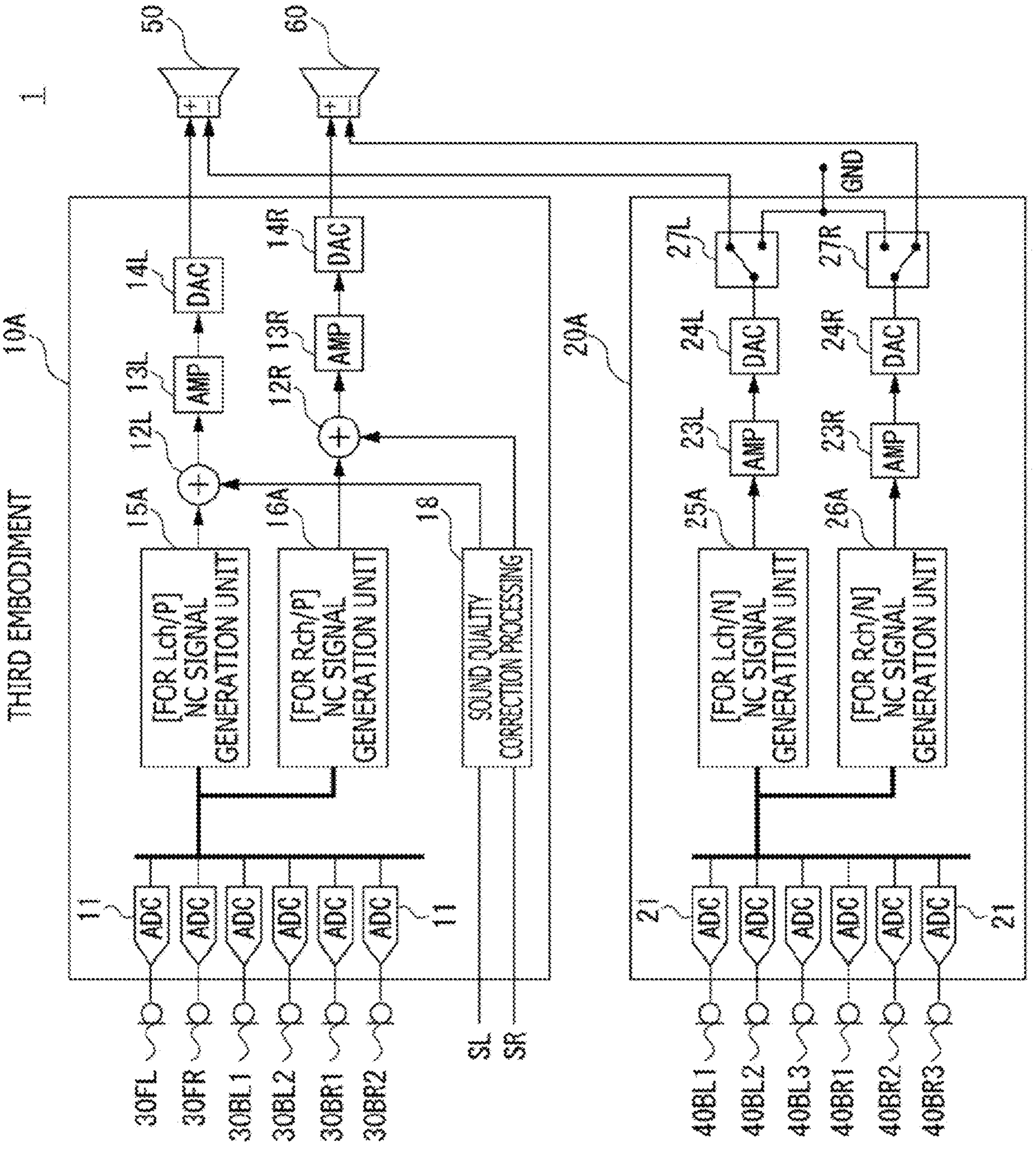
FIG. 8 is a block diagram of an acoustic processing device according to the third embodiment.

FIG. 8 depicts internal configurations of the signal processing units 10A and 20A.

The signal processing units 10A and 20A have configurations similar to the configurations of the signal processing units 10 and 20 in FIG. 4. Particularly, NC signal generation units 15A, 16A, 25A, and 26A for generating NC signals correspond to the acoustic signal generation units 15, 16, 25, and 26 in FIG. 4, respectively.

The NC signal generation unit 15A generates NC signals for the L channel based on the FF scheme and the FB scheme, on the basis of audio signals from the microphones 30FL, 30BL1, and 30BL2.

Each of the NC signals generated by the NC signal generation unit 15A is synthesized with the acoustic signal SL by the adder 12L and supplied to the positive electrode terminal of the speaker 50 via the power amplifier 13L and the DAC 14L.

The NC signal generation unit 16A generates NC signals for the R channel based on the FF scheme and the FB scheme, on the basis of audio signals from the microphones 30FR, 30BR1, and 30BR2.

Each of the NC signals generated by the NC signal generation unit 16A is synthesized with the acoustic signal SR by the adder 12R and supplied to the positive electrode terminal of the speaker 60 via the power amplifier 13R and the DAC 14R.

The NC signal generation unit 25A generates NC signals for the L channel based on the FB scheme, on the basis of audio signals from the microphones 40BL1, 40BL2, and 40BL3.

Each of the NC signals generated by the NC signal generation unit 25A is supplied to the negative electrode terminal of the speaker 50 via the power amplifier 23L, the DAC 24L, and the switch unit 27L.

The NC signal generation unit 26A generates NC signals for the R channel based on the FB scheme, on the basis of audio signals from the microphones 40BR1, 40BR2, and 40BR3.

Each of the NC signals generated by the NC signal generation unit 26A is supplied to the negative electrode terminal of the speaker 60 via the power amplifier 23R, the DAC 24R, and the switch unit 27R.

In this configuration, input signals from the six microphones 30, which are disposed to generate positive signals, are NC-filtered for each of the left and right channels in the signal processing unit 10 and are then allowed to be acoustically output via the positive electrode terminals of the speakers 50 and 60.

Moreover, input signals from the six microphones 40, which are disposed to generate negative signals, are NC-filtered for each of the left and right channels in the signal processing unit 20 and are then allowed to be acoustically output via the negative electrode terminals of the speakers 50 and 60.

Accordingly, NC signals based on input signals from all the twelve microphones connected to the two NC devices (i.e., signal processing units 10A and 20A) can be output from each of the left and right speakers 50 and 60. Moreover, reproduction of music or the like based on the acoustic signals SL and SR can be performed together with the NC signals.

In other words, an NC system having considerably improved NC performance can be constructed.

In addition, in the case of this configuration, the negative electrode terminals of the speakers 50 and 60 can be connected to the ground by using the switch units 27L and 27R. For example, switching operations of the switch units 27L and 27R can be performed by a manual operation or the like made by a user.

In a state where the negative electrode terminals of the speakers 50 and 60 are connected to the ground, positive signals generated by the signal processing unit 10A are supplied to the speakers 50 and 60. Specifically, reproduction of music or the like based on the acoustic signals SL and SR is performed while NC effects are produced by NC signals based on the FF scheme and the FB scheme using the six microphones 30 including the microphones 30FL, 30BL1, 30BL2, 30FR, 30BR1, and 30BR2.

This means that the signal processing unit 20A may be powered off.

Specifically, upon the reproduction of music or the like based on the acoustic signals SL and SR, a state where both the signal processing units 10A and 20A are made to operate to thereby obtain a high NC effect and a state where only the signal processing unit 10A is made to operate to thereby obtain a normal NC effect can selectively be changed. Moreover, such effects as power consumption reduction and elongation of a reproduction time can be obtained by causing the signal processing unit 20A to be powered off for a certain period of time.

For example, when the signal processing unit 20A is turned off in an environment which is less noisy and which does not require high NC effects, such as the inside of a room and an office, preferable music reproduction can be performed, and a user can enjoy the music with reduced power consumption.

3-3: Fourth Embodiment

Figure 9:
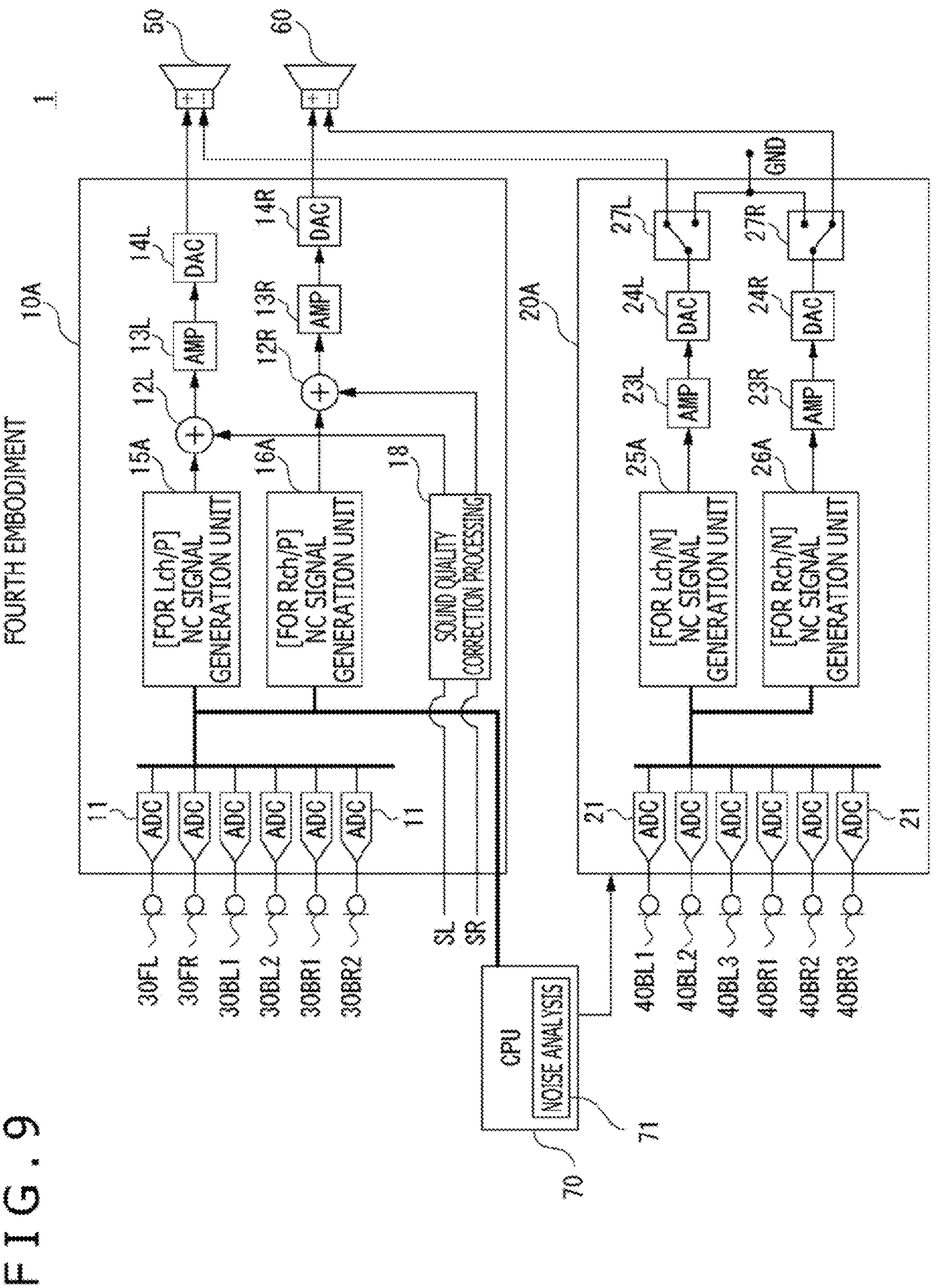
FIG. 9 is a block diagram of an acoustic processing device according to a fourth embodiment.

FIG. 9 depicts a configuration example of the fourth embodiment.

This is an example where a CPU 70 is provided and the switch units 27L and 27R are automatically controlled.

The CPU 70 includes a noise analysis unit 71 which receives, as input, all or some of audio signals of sounds collected by the microphones 30FL, 30BL1, 30BL2, 30FR, 30BR1, and 30BR2 and which analyzes a noise status, for example.

For example, the noise analysis unit 71 analyzes a noise level, a frequency characteristic, a noise continuation state, and the like.

Thereafter, the CPU 70 determines whether or not a noise is loud in the current status, on the basis of a noise analysis result, and controls the signal processing unit 20A.

Specifically, in a case where the CPU 70 determines that the noise is not loud in the current status, the CPU 70 controls the switch units 27L and 27R to switch them to the ground connection and controls the signal processing unit 20A to power it off.

In a case where the CPU 70 determines that the noise is loud in the current status, the CPU 70 controls the switch units 27L and 27R to switch them to a state where negative signals can be supplied to the negative electrode terminals, and controls the signal processing unit 20A to power it on.

Note that, needless to say, in a case where the switch units 27L and 27R are included in the signal processing unit 20A, such a circuit configuration which maintains ground connection (e.g., a state where the negative electrode terminals are not opened) even in a state where the signal processing unit 20A is powered off is required.

When the CPU 70 performs the abovementioned control, NC effects are automatically adjusted according to a peripheral-noise status, and the signal processing unit 20A is automatically powered off in a relatively quiet environment to perform a power saving operation.

Note that the switching control of the switch units 27L and 27R and power-off control of the signal processing unit 20A may be performed on the basis of other situations except the noise status or in addition to the noise status.

For example, the CPU 70 may monitor a battery status as a status of the acoustic output device 1. When a remaining battery level becomes a predetermined value or smaller, the CPU 70 may control the switch units 27L and 27R to switch them to the ground connection, and control the signal processing unit 20A to power it off. This brings an advantageous effect when it comes to long-time driving of the acoustic output device 1.

In addition, for example, the CPU 70 may monitor a sound-volume setting status as a status of the acoustic output device 1 and perform switching control of the switch units 27L and 27R and power control of the signal processing unit 20A on the basis of whether or not the sound volume is small. This is because an ordinary NC function is assumed to be sufficient during music reproduction with a relatively large sound volume.

Further, switching control of the switch units 27L and 27R and power control of the signal processing unit 20A may be performed on the basis of estimation of a noise status according to a current position of a user and a position change instead of the noise status itself. For example, the acoustic output device 1 (CPU 70) is given a current-position detection function. In this case, the CPU 70 determines, for example, whether the user is present inside or outside a building and whether the user is taking a train, and when the CPU 70 determines that NC effects need to be increased on the basis of the user's current position, the CPU 70 powers on the signal processing unit 20A and controls the switch units 27L and 27R to switch them to the negative signal side, for example.

Moreover, the CPU 70 may perform switching control of the switch units 27L and 27R and power control of the signal processing unit 20A according to a status of a type of music or the like reproduced on the basis of the input acoustic signals SL and SR, e.g., according to whether the reproduced sound is music, a conversation voice, an environment sound, an electronic sound, a notification sound, or the like.

Further, the CPU 70 may perform switching control of the switch units 27L and 27R and power control of the signal processing unit 20A according to a status of music or the like reproduced on the basis of the input acoustic signals SL and SR, e.g., according to such genres as rock music, jazz, classical music, and popular music, an average sound pressure level of a song currently reproduced, a frequency characteristic, or other features.

In addition, the CPU 70 may perform switching control of the switch units 27L and 27R and power control of the signal processing unit 20A according to a body status of a user. For example, the CPU 70 includes a sensor for detecting the body status, such as an electroencephalogram sensor, a pulse sensor, and a blood pressure sensor, and performs control according to a body status of the user determined by any of these sensors.

Moreover, the CPU 70 may perform switching control of the switch units 27L and 27R and power control of the signal processing unit 20A according to an action status of the user. For example, the CPU 70 includes an angular velocity sensor, an acceleration sensor, or the like, and performs control according to an action status of the user determined by any of these sensors.

3-4: Fifth Embodiment

Figure 10:
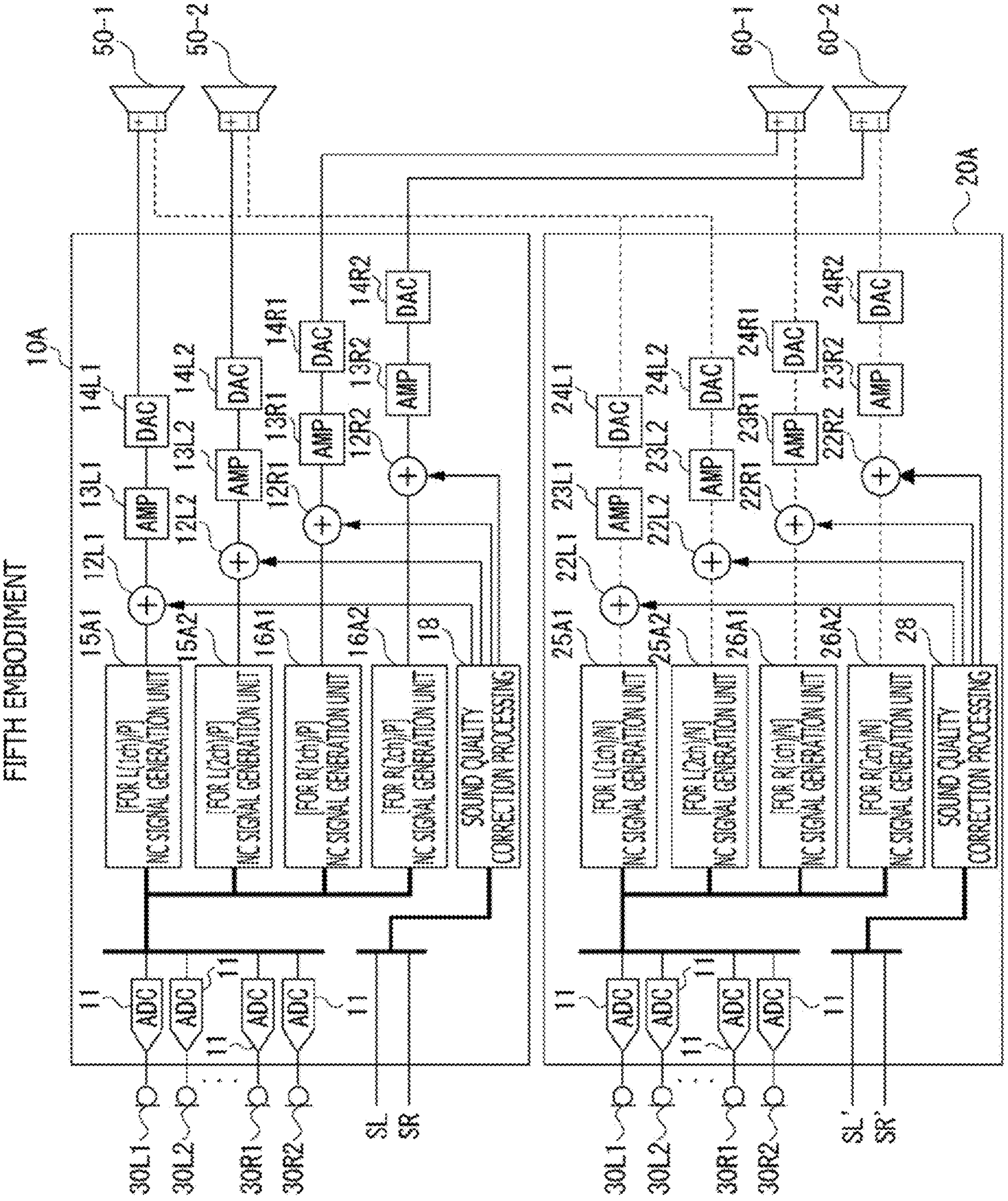
FIG. 10 is a block diagram of an acoustic processing device according to a fifth embodiment.

FIG. 10 depicts a configuration example of the fifth embodiment.

In the example in FIG. 10, the R2-channel acoustic output device 1 includes multiple speakers (headphone drivers) for each channel to perform NC control with higher performance.

The acoustic output device 1 in FIG. 10 includes two speakers 50-1 and 50-2 as L-channel speakers disposed in the left housing 5L. The acoustic output device 1 further includes two speakers 60-1 and 60-2 as R-channel speakers disposed in the right housing 5R.

The signal processing unit 10A includes four NC signal generation units 15A1, 15A2, 16A1, and 16A2 for generating positive signals.

For example, the NC signal generation unit 15A1 generates an NC signal for the L channel based on the FF scheme, on the basis of audio signals from the microphone 30FL. This NC signal is synthesized with the acoustic signal SL by an adder 12L1 and supplied to a positive electrode terminal of the speaker 50-1 via a power amplifier 13L1 and a DAC 14L1.

For example, the NC signal generation unit 15A2 generates an NC signal for the L channel based on the FB scheme, on the basis of audio signals from the microphones 30BL1 and 30BL2. This NC signal is synthesized with the acoustic signal SL by an adder 12L2 and supplied to a positive electrode terminal of the speaker 50-2 via a power amplifier 13L2 and a DAC 14L2.

For example, the NC signal generation unit 16A1 generates an NC signal for the R channel based on the FF scheme, on the basis of audio signals from the microphone 30FR. This NC signal is synthesized with the acoustic signal SR by an adder 12R1 and supplied to a positive electrode terminal of the speaker 60-1 via a power amplifier 13R1 and a DAC 14R1.

For example, the NC signal generation unit 16A2 generates an NC signal for the R channel based on the FB scheme, on the basis of audio signals from the microphones 30BR1 and 30BR2. This NC signal is synthesized with the acoustic signal SR by an adder 12R2 and supplied to a positive electrode terminal of the speaker 60-2 via a power amplifier 13R2 and a DAC 14R2.

Note that, according to the example described above, each of the NC signal generation units 15A1 and 16A1 generates the NC signal based on the FF scheme, while each of the NC signal generation units 15A2 and 16A2 generates the NC signal based on the FB scheme. However, this case is presented only by way of example.

The signal processing unit 20A includes four NC signal generation units 25A1, 25A2, 26A1, and 26A2 for generating negative signals.

Note that acoustic signals SL' and SR' are input to the signal processing unit 20A and processed by the sound quality correction processing unit 28. The acoustic signals SL' and SR' may be signals identical to the acoustic signals SL and SR, signals obtained by adjusting the acoustic signals SL and SR, or signals different from the acoustic signals SL and SR.

For example, the NC signal generation unit 25A1 generates an NC signal for the L channel based on the FB scheme, on the basis of audio signals from the microphones 40BL1 and 40BL2. This NC signal is synthesized with the acoustic signal SL' by an adder 22L1 and supplied to a negative electrode terminal of the speaker 50-1 via a power amplifier 23L1 and a DAC 24L1.

For example, the NC signal generation unit 25A2 generates an NC signal for the L channel based on the FB scheme, on the basis of audio signals from the microphone 40BL3. This NC signal is synthesized with the acoustic signal SL' by an adder 22L2 and supplied to a negative electrode terminal of the speaker 50-2 via a power amplifier 23L2 and a DAC 24L2.

For example, the NC signal generation unit 26A1 generates an NC signal for the R channel based on the FB scheme, on the basis of audio signals from the microphones 40BR1 and 40BR2. This NC signal is synthesized with the acoustic signal SR' by an adder 22R1 and supplied to a negative electrode terminal of the speaker 60-1 via a power amplifier 23R1 and a DAC 24R1.

For example, the NC signal generation unit 26A2 generates an NC signal for the R channel based on the FB scheme, on the basis of audio signals from the microphone 40BR3. This NC signal is synthesized with the acoustic signal SR' by an adder 22R2 and supplied to a negative electrode terminal of the speaker 60-2 via a power amplifier 23R2 and a DAC 24R2.

According to the configuration example depicted in FIG. 10, each of the signal processing units 10A and 20A, which are individual NC devices, is configured to perform stereo processing alone.

In a case where the stereo processing is performed by a single signal processing unit, the LSI as the signal processing unit 10A outputs four signals in total, i.e., two positive signals for the L channel and two positive signals for Rch. Moreover, the LSI as the signal processing unit 20A outputs four signals in total, i.e., two negative signals for the L channel and two negative signals for Rch.

With this configuration, the signal processing unit 20A can be powered on or off while the four-channel output is continued. Accordingly, an NC function operation with reduced power consumption can be performed.

Note that, while FIG. 10 depicts the configuration example where the acoustic signals SL' and SR' are input to the signal processing unit 20A, the acoustic output device 1 may have a configuration in which the acoustic signals SL' and SR' are not input and the sound quality correction processing unit 28 and the adders 22L1, 22L2, 22R1, and 22R2 are not included.

4. Application to BF Processing and NC Processing: Sixth Embodiment

An example where a BF (beam forming) function is provided in addition to the NC function will be described in the sixth embodiment.

Figure 11:
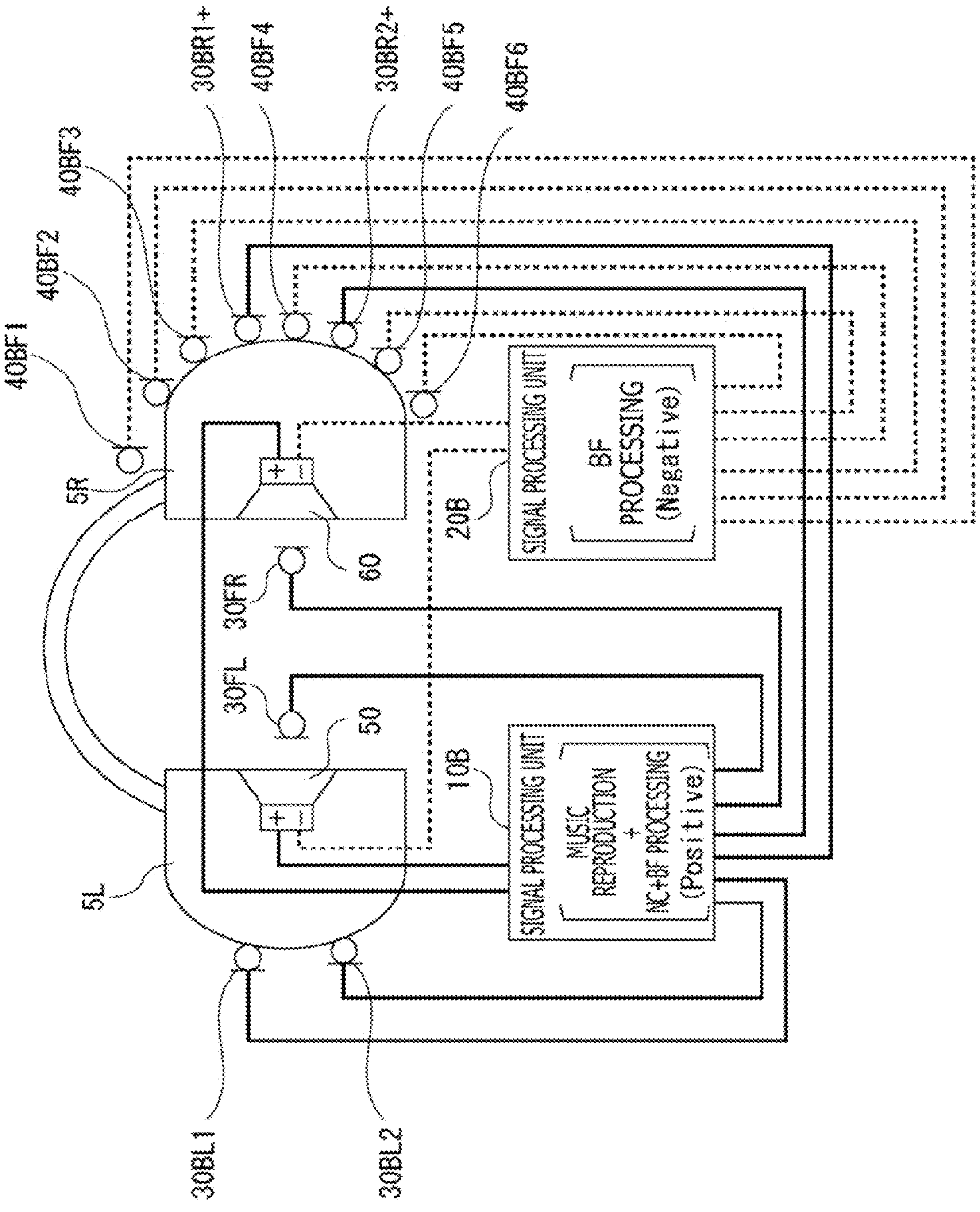
FIG. 11 is an explanatory diagram of a configuration according to a sixth embodiment.

FIG. 11 depicts a layout of the microphones 30 and 40 and a configuration example of signal processing units 10B and 20B.

The following three microphones in total are disposed as the microphones 30 on the left housing 5L of the acoustic output device 1.

microphone 30FL for L-channel FF
microphone 30BL1 for L-channel FB
microphone 30BL2 for L-channel FB Moreover, the following nine microphones in total are disposed as the microphones 30 and 40 on the right housing 5R.

microphone 30FR for R-channel FF
microphone 30BR1+ for BF and for R-channel FB
microphone 30BR2+ for BF and for R-channel FB
microphone 40BF1 for BF
microphone 40BF2 for BF
microphone 40BF3 for BF
microphone 40BF4 for BF
microphone 40BF5 for BF
microphone 40BF6 for BF Each of the microphones 30BR1+ and 30BR2+ is used for both NC and BF.

The microphones 30BL1, 30BL2, 30BR1+, and 30BR2+ used for NC are disposed in such positions as to be bilaterally symmetrical for the purpose of capturing noises in a wide range for NC effects.

On the other hand, the microphones 40BF1, 40BF2, 40BF3, 30BR1+, 40BF4, 30BR2+, 40BF5, and 40BF6 for BF are continuously disposed in one direction (e.g., right housing 5R) so as to produce high directivity for BF.

Each of the signal processing units 10B and 20B is an LSI circuit which accepts input from six channels.

In FIG. 11, signal paths for generation or output of positive signals are indicated by solid lines, while signal paths for generation or output of negative signals are indicated by dotted lines, as in FIG. 7.

The signal processing unit 10B has a function of generating NC and BF signals as well as the function of reproducing music or the like and receives, as input, audio signals of sounds collected by the six microphones 30 (30FL, 30BL1, 30BL2, 30FR, 30BR1+, and 30BR2+), as indicated by solid lines.

The signal processing unit 20B has a function of generating BF signals and receives, as input, audio signals of sounds collected by the six microphones 40 (40BF1, 40BF2, 40BF3, 40BF4, 40BF5, and 40BF6), as indicated by dotted lines.

In other words, the LSI which is the signal processing unit 10B handles music reproduction and NC+BF processing, while the signal processing unit 20B which is the other LSI handles only the BF processing.

In addition, the signal processing unit 10B supplies positive signals containing NC signal components based on the FF scheme and the FB scheme and BF signals to the positive electrode terminals of the speakers 50 and 60. Meanwhile, the signal processing unit 20B supplies negative signals corresponding to BF signals to the negative electrode terminals of the speakers 50 and 60.

Figure 12:
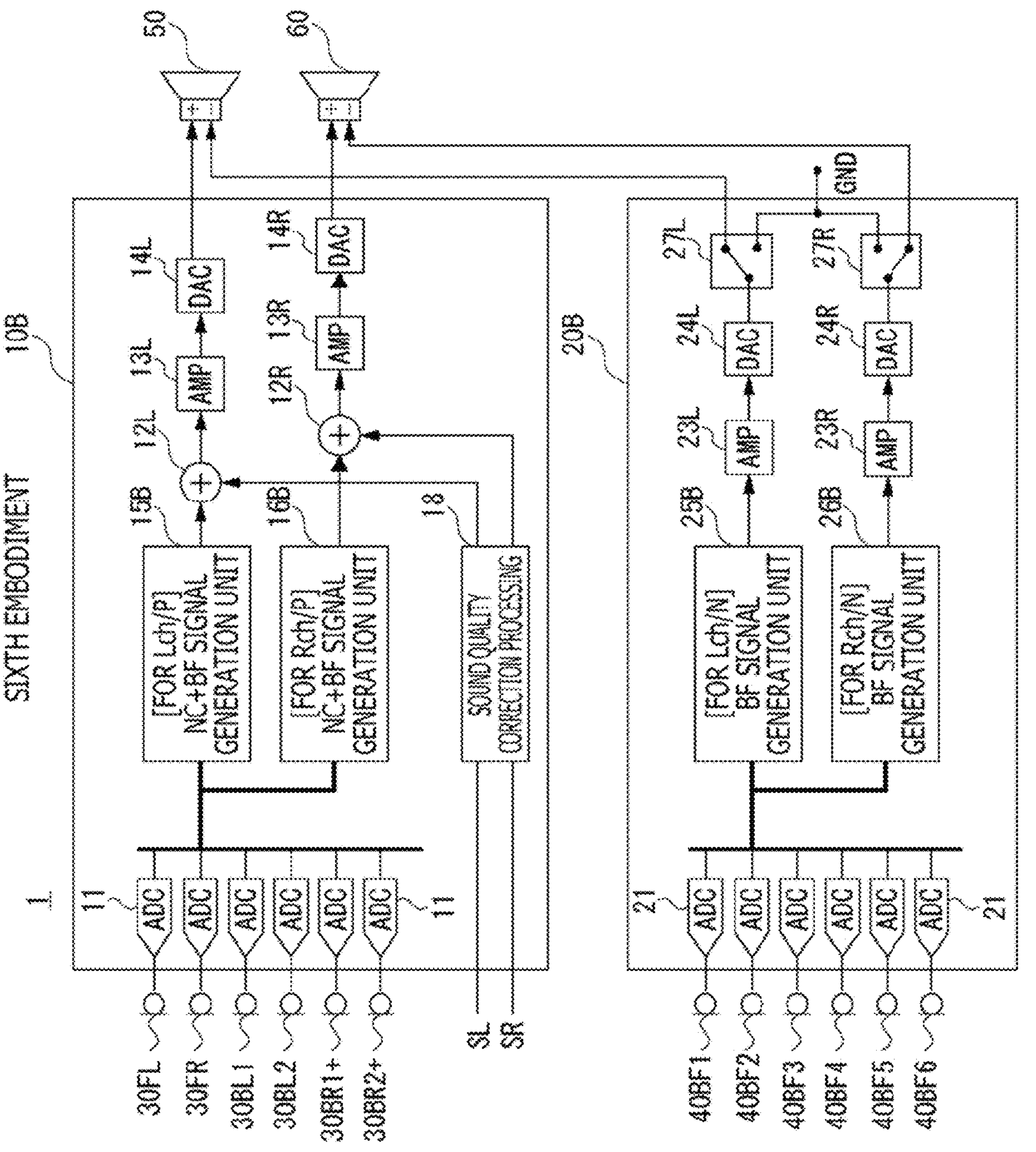
FIG. 12 is a block diagram of an acoustic processing device according to the sixth embodiment.

FIG. 12 depicts internal configurations of the signal processing units 10B and 20B.

The signal processing units 10B and 20B have configurations similar to the configurations of the signal processing units 10 and 20 in FIG. 4. Particularly, the configurations of NC+BF signal generation units 15B and 16B for generating NC and BF signals correspond to the configurations of the acoustic signal generation units 15 and 16 in FIG. 4.

Moreover, the configurations of BF signal generation units 25B and 26B for generating BF signals correspond to the configurations of the acoustic signal generation units 25 and 26 in FIG. 4.

The NC+BF signal generation unit 15B generates NC signals for the L channel based on the FF scheme and the FB scheme, on the basis of audio signals from the microphones 30FL, 30BL1, and 30BL2, and also generates BF signals on the basis of audio signals from the microphones 30BR1+ and 30BR2+. An acoustic signal generated by the NC+BF signal generation unit 15B described above is synthesized with the acoustic signal SL by the adder 12L and supplied to the positive electrode terminal of the speaker 50 via the power amplifier 13L and the DAC 14L.

The NC+BF signal generation unit 16B generates NC signals for the R channel based on the FF scheme and the FB scheme, on the basis of audio signals from the microphones 30FR, 30BR1+, and 30BR2+, and also generates BF signals on the basis of audio signals from the microphones 30BR1+ and 30BR2+. An acoustic signal generated by the NC+BF signal generation unit 16B described above is synthesized with the acoustic signal SR by the adder 12R and supplied to the positive electrode terminal of the speaker 60 via the power amplifier 13R and the DAC 14R.

The BF signal generation unit 25B generates a BF signal for the L channel on the basis of audio signals from the six microphones 40. This BF signal is supplied to the negative electrode terminal of the speaker 50 via the power amplifier 23L, the DAC 24L, and the switch unit 27L.

The BF signal generation unit 26B generates a BF signal for the R channel on the basis of audio signals from the six microphones 40. This BF signal is supplied to the negative electrode terminal of the speaker 60 via the power amplifier 23R, the DAC 24R, and the switch unit 27R.

With this configuration, NC effects and BF effects can be obtained at the time of acoustic output such as music and external sounds by causing both the signal processing units 10B and 20B to operate.

Moreover, in a case where the BF processing is unnecessary, it is sufficient to power off the signal processing unit 20B, control the switch units 27L and 27R to connect the negative electrode terminals of the speakers 50 and 60 to the ground, and stop the NC processing by the signal processing unit 10B. In this manner, a considerable power saving effect can be obtained.

5. Application to Left-Right Separation Type Earphones: Seventh Embodiment

An example where the NC and BF functions are applied to left-right separation type earphones will be described in the seventh embodiment.

Figure 13:
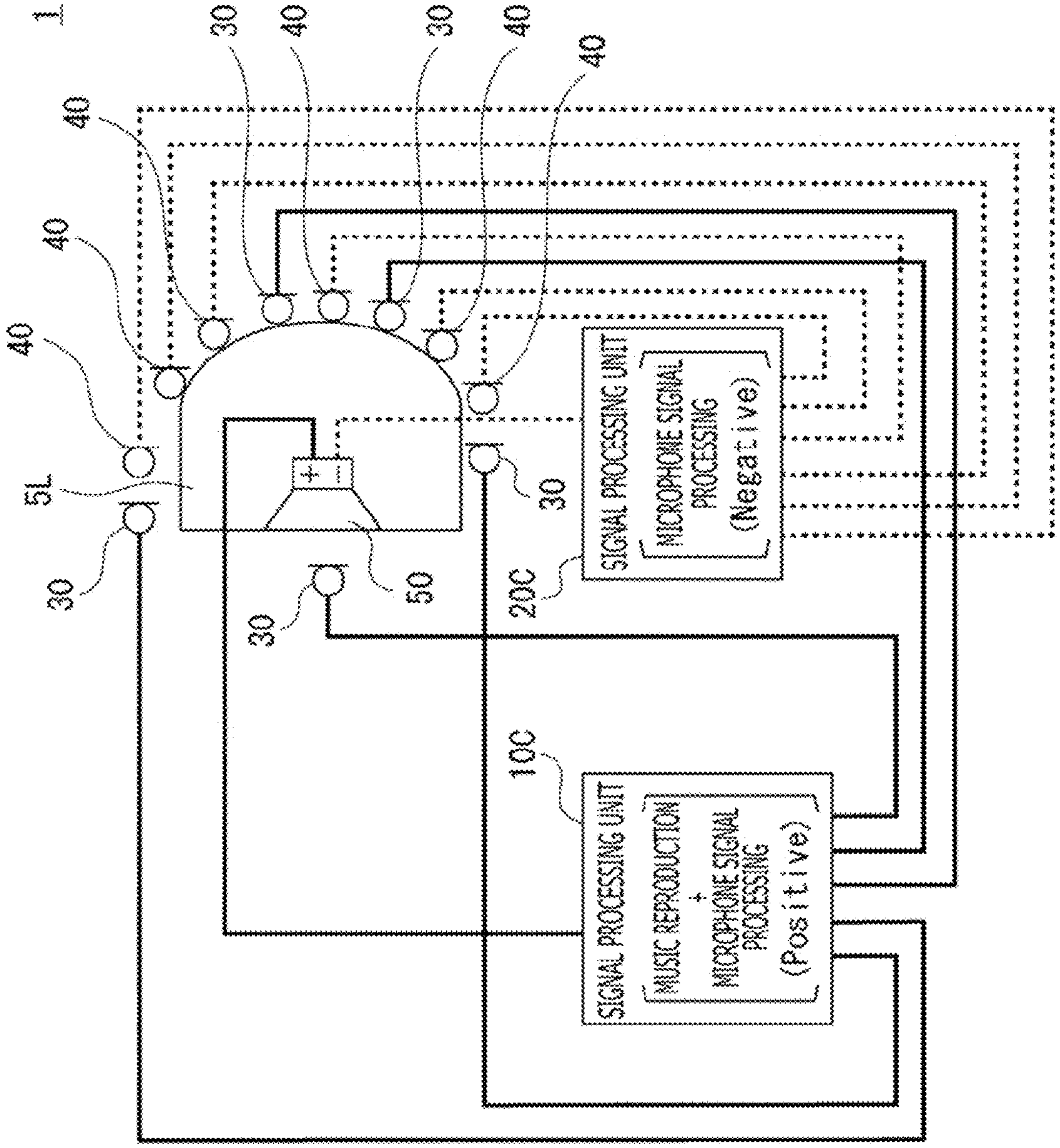
FIG. 13 is an explanatory diagram of a configuration according to a seventh embodiment.

FIG. 13 depicts a configuration on only the L-channel side. The R channel is not depicted in the figure but has a configuration similar to the configuration on the L-channel side.

In an example of the configuration on the L-channel side of the left-right separation type acoustic output device 1 in FIG. 13, the eleven microphones in total, i.e., the five microphones 30 and the six microphones 40, are disposed on the left housing 5L. Needless to say, the eleven microphones herein are given only by way of example.

In FIG. 13, signal paths for generation or output of positive signals are indicated by solid lines, while signal paths for generation or output of negative signals are indicated by dotted lines, similarly to FIG. 7.

Each of signal processing units 10C and 20C is an LSI circuit which accepts input from six channels.

The signal processing unit 10C has a processing function for music reproduction or the like and receives, as input, audio signals of sounds collected by the five microphones 30 as indicated by solid lines.

The signal processing unit 20C receives, as input, audio signals of sounds collected by the six microphones 40 as indicated by dotted lines.

In addition, the signal processing unit 10C supplies positive signals containing acoustic signals generated on the basis of the microphones 30 to the positive electrode terminals of the speakers 50 and 60.

Moreover, the signal processing unit 20C supplies negative signals containing acoustic signals generated on the basis of the microphones 40 to the negative electrode terminals of the speakers 50 and 60.

Figure 14:
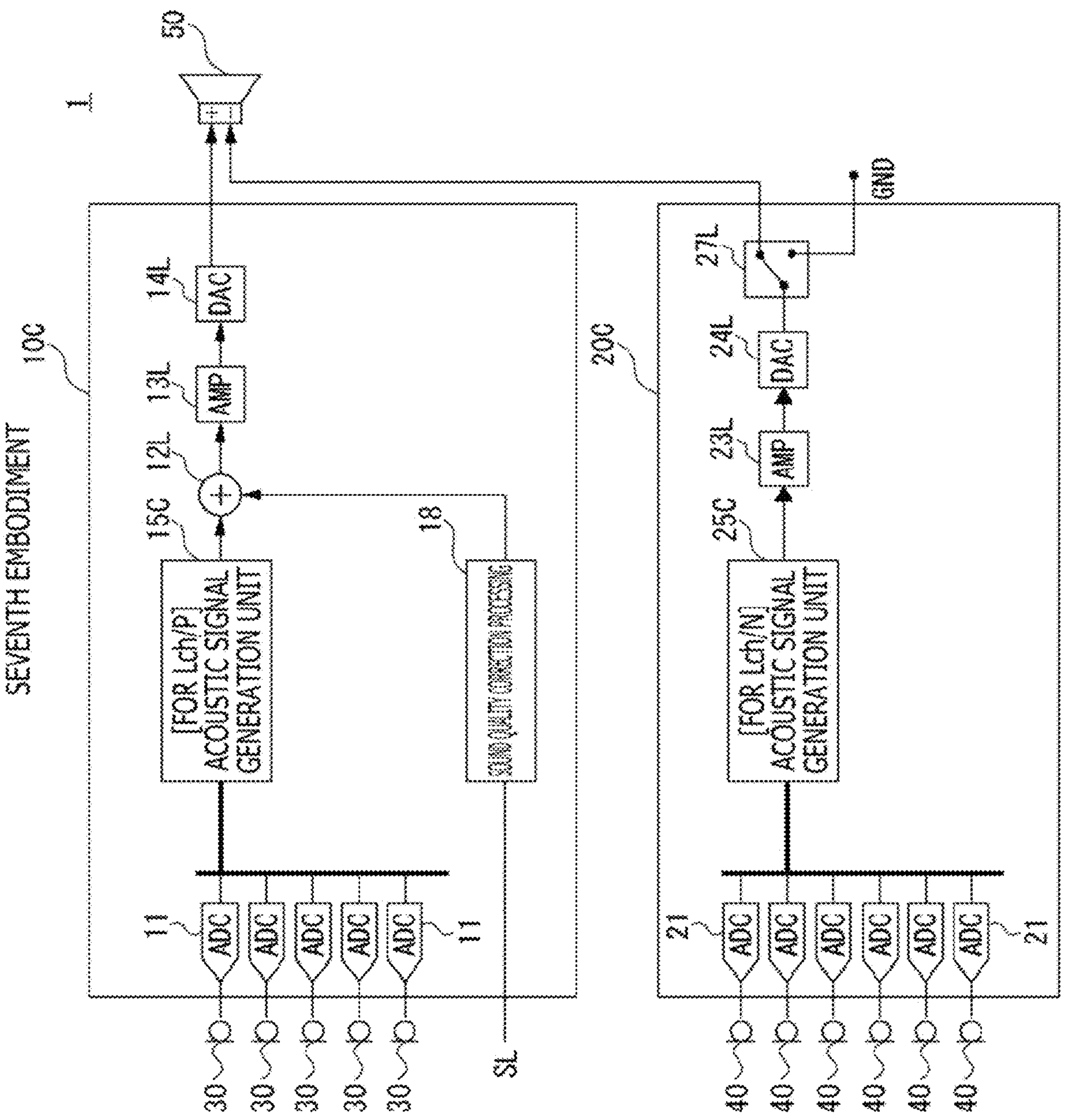
FIG. 14 is a block diagram of an acoustic processing device according to the seventh embodiment.

FIG. 14 depicts internal configurations of the signal processing units 10C and 20C.

The signal processing units 10C and 20C have components corresponding to the components for L channel included in the signal processing units 10 and 20 in FIG. 4. Specifically, an acoustic signal generation unit 15C corresponds to the acoustic signal generation unit 15 in FIG. 4, and an acoustic signal generation unit 25C corresponds to the acoustic signal generation unit 25 in FIG. 4.

The acoustic signal generation unit 15C generates an acoustic signal for the L channel on the basis of audio signals from the five microphones 30. The microphones 30 arranged as depicted in FIG. 13 can generate NC signals or BF signals. The acoustic signal generated by the acoustic signal generation unit 15C is synthesized with the acoustic signal SL by the adder 12L and supplied to the positive electrode terminal of the speaker 50 via the power amplifier 13L and the DAC 14L.

The acoustic signal generation unit 25C generates an acoustic signal for the L channel on the basis of audio signals from the six microphones 40. The microphones 40 arranged as depicted in FIG. 13 can generate BF signals. This acoustic signal is supplied to the negative electrode terminal of the speaker 50 via the power amplifier 23L, the DAC 24L, and the switch unit 27L.

Accordingly, in the seventh embodiment described herein, the signal processing units 10C and 20C are used for only the L channel. In this case, NC effects, BF effects, or other effects can be obtained at the time of acoustic output such as music and external sounds by causing both the signal processing units 10C and 20C to operate.

Moreover, in a case where such processing as described above is unnecessary, the signal processing unit 20C is powered off, and the negative electrode terminal of the speaker 50 is connected to the ground by the switch unit 27L, for example. Thus, a power saving effect is obtained.

The seventh embodiment described herein is suited for a case where a larger number of microphones are used per one channel to improve the performance of various types of signal processing.

Processing performed by each of the acoustic signal generation units 15C and 25C is not limited to the NC signal generation processing and the BF signal generation processing, and it is conceivable that each of the acoustic signal generation units 15C and 25C performs external-sound emphasis signal generation processing, particular-frequency emphasis signal generation processing, processing for emphasizing a sound travelling from a particular direction, or other processing, or performs a combination of these items of processing.

6. Linkage with External Device: Eighth Embodiment

Figure 15:
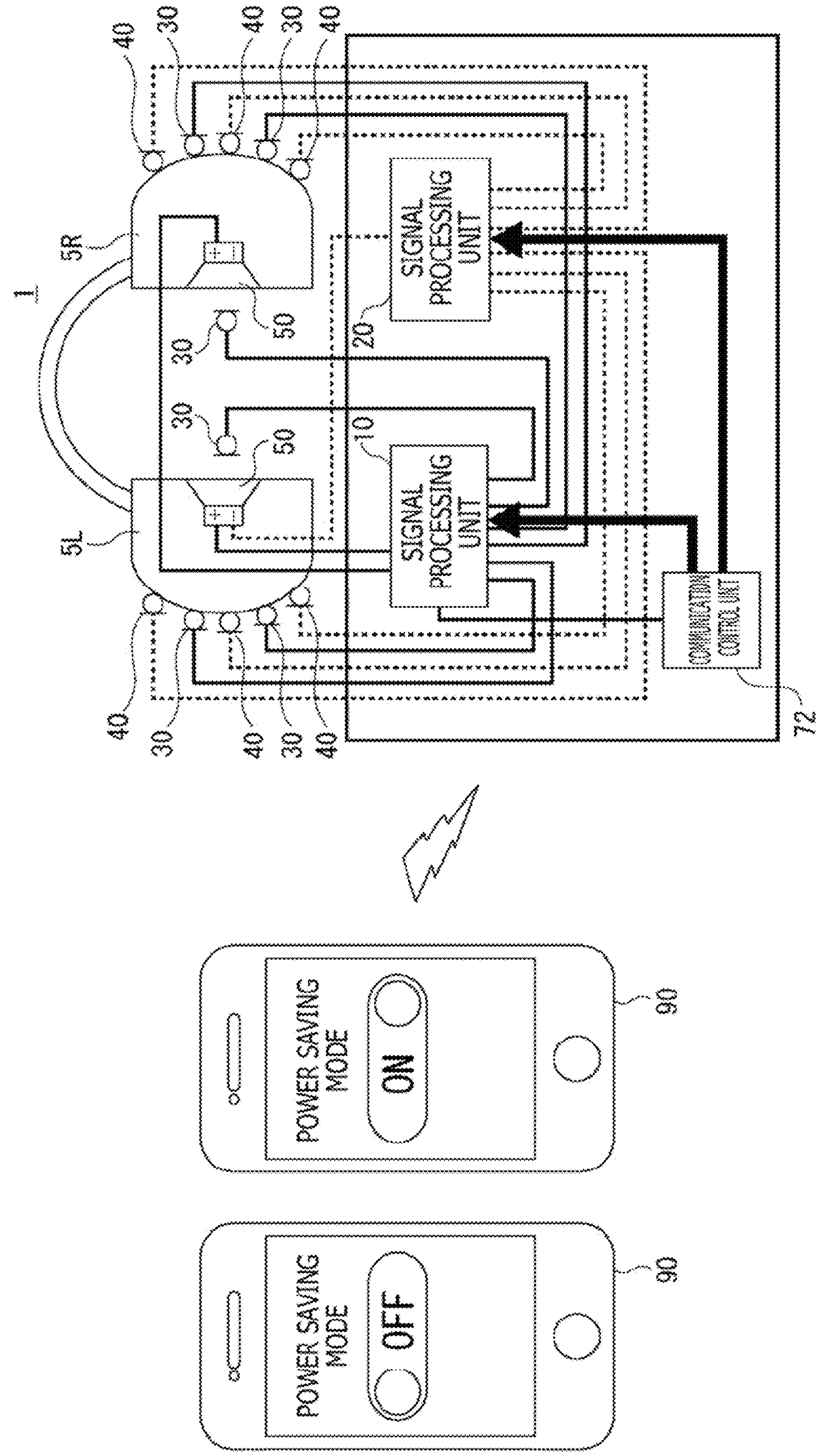
FIG. 15 is an explanatory diagram of an eighth embodiment.

An example where the acoustic output device 1 operates in association with terminal devices 90 which are external devices will be described in the eighth embodiment. FIG. 15 depicts an example where the acoustic output device 1 having a configuration similar to the configuration of FIG. 4, for example, further includes a communication control unit 72.

The communication control unit 72 is, for example, a chip (SoC: System-on-a-chip) functioning as a communication control unit for Bluetooth and is capable of performing near-field wireless communication with the terminal devices 90.

Moreover, the communication control unit 72 is capable of controlling the signal processing units 10 and 20, similarly to the CPU 70 depicted in FIG. 9. For example, it is assumed that the communication control unit 72 is capable of performing power on/off control of the signal processing unit 20 and switching control of the switch units 27L and 27R. Moreover, the communication control unit 72 is capable of performing control to stop the signal generation function of the acoustic signal generation units 15 and 16 of the signal processing unit 10, for example.

In this configuration, for example, each of the terminal devices 90 transmits a control signal to the acoustic output device 1 according to operations made by a user or various statuses, and the communication control unit 72 performs operation control of the signal processing units 10 and 20.

For example, FIG. 15 depicts a state where interface display for operation is presented on a screen of each of the terminal devices 90 such as a smartphone to allow the user to perform on/off operation of a power saving mode.

The terminal device 90 transmits the control signal to the communication control unit 72 according to the operation made by user using this interface.

The terminal device 90 is configured as what is called an information processing device and includes therein a processor such as a CPU, a storage unit such as a ROM, a RAM, and a non-volatile memory, an interface device unit such as a display unit and an operation unit, various types of sensor units, a communication device unit, and the like.

Figure 16:
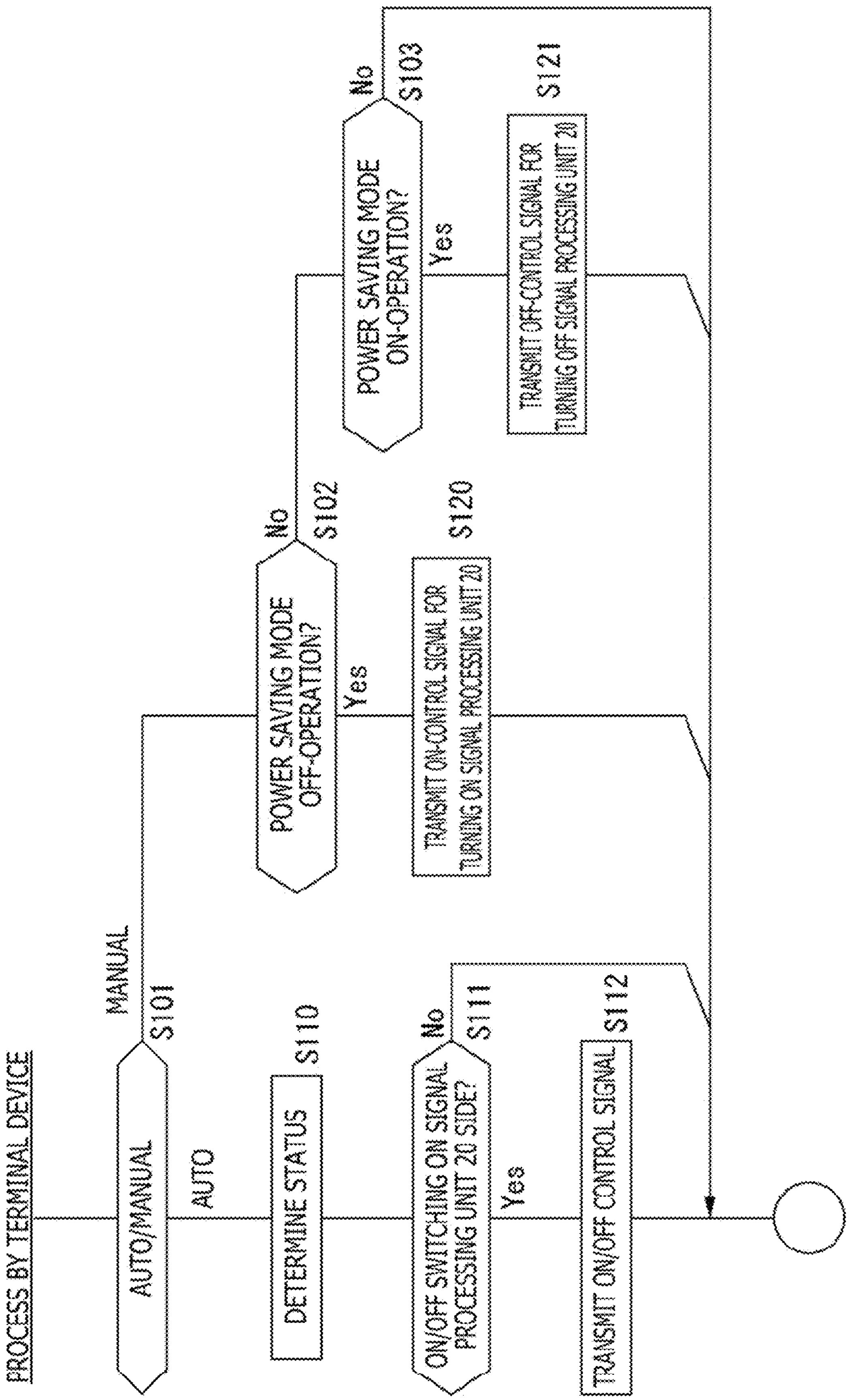
FIG. 16 is a flowchart of a process performed by a terminal device according to the eighth embodiment.

The CPU included in the terminal device 90 performs a control signal transmission process by performing a process depicted in FIG. 16.

In step S101, the CPU of the terminal device 90 selectively performs processing according to whether the current mode is an auto mode or a manual mode. The manual mode is a mode for turning on or off the signal processing unit 20 of the acoustic output device 1 according to an operation made by a user. The auto mode is a mode for automatically turning on or off the signal processing unit 20 according to a status determination.

In the case of the manual mode, the CPU of the terminal device 90 monitors in steps S102 and S103 the operation made by the user.

If the CPU of the terminal device 90 detects that an operation is made by the user to turn off the power saving mode as depicted in FIG. 15, the CPU advances the process from step S102 to step S120 and transmits an on-control signal for turning on the signal processing unit 20 to the acoustic output device 1.

In response to the reception of the on-control signal, the communication control unit 72 of the acoustic output device 1 controls the signal processing unit 20 to turn it on and controls the switch units 27L and 27R to switch them to the negative-signal connection. Some of the processing functions on the signal processing unit 10 side (e.g., BF function) may be started depending on cases. In other words, when the power saving mode is turned off, both the signal processing units 10 and 20 are brought into a state for operation.

On the other hand, if the CPU of the terminal device 90 detects that an operation is made by the user to turn on the power saving mode as depicted in FIG. 15, the CPU advances the process from step S103 to step S121 and transmits an off-control signal for turning off the signal processing unit 20 to the acoustic output device 1.

In response to the reception of the off-control signal, the communication control unit 72 of the acoustic output device 1 controls the signal processing unit 20 to turn it off and controls the switch units 27L and 27R to switch them to the ground connection. Some of the processing functions on the signal processing unit 10 side (e.g., BF function) may be stopped depending on cases. In other words, when the power saving mode is turned on, the signal processing unit 20 is turned off while only the signal processing unit 10 is brought into the state for operation.

In the case of the auto mode, the CPU of the terminal device 90 advances the process from step S101 to step S110 and performs a status determination process. Status determination may include various types of status determination as follows.

- determination of peripheral-noise status
- determination of current-position status
- determination of remaining battery level status of acoustic output device 1, the determination being made through communication with communication control unit 72
- determination of sound volume of acoustic output device 1, the determination being made through communication with communication control unit 72
- determination of action status of user (e.g., whether or not motion of user who is walking or the like is large)
- determination of body status of user (body status based on electroencephalogram, pulse, blood pressure, or others of user)
- determination of acoustic status of sound being reproduced (e.g., acoustic signal SL or SR, genre, sound volume)

The peripheral status, the environment status, the status of the acoustic output device 1, the status of the user, and the like as described above are detected or determined to determine whether or not to execute the operation on the signal processing unit 20 side where negative signals are generated.

In a case where the CPU of the terminal device 90 determines that the operation of the signal processing unit 20 is to be switched to on or off, the CPU advances the process from step S111 to step S112 and transmits an on-control signal or an off-control signal to the acoustic output device 1.

In response to the reception of the on-control signal or the off-control signal, the communication control unit 72 of the acoustic output device 1 controls the signal processing unit 20 to turn it on or off and performs switching control of the switch units 27L and 27R. Some of the processing functions on the signal processing unit 10 side may be started or stopped depending on cases.

When such a process as described above is performed on the terminal device 90 side, automatic on/off control of the signal processing unit 20 can accurately be performed on the acoustic output device 1 side without a need for a calculation resource, detection means, or the like having a high processing ability.

7. Summary and Modifications

According to the embodiments described above, the following advantageous effects are obtained.

The acoustic processing device according to each of the embodiments is provided as the acoustic output device 1 itself such as the headphones 1A and 1B and the earphones 1C and 1D, or as an internal circuit of the acoustic output device.

Such an acoustic processing device thus configured includes the first signal processing unit 10 which uses input audio signals from a first group of microphones 30 to generate positive signals to be supplied to the respective positive electrode terminals of the first and second speakers 50 and 60, and the second signal processing unit 20 which uses input audio signals from a second group of microphones 40 to generate negative signals to be supplied to the respective negative electrode terminals of the first and second speakers 50 and 60.

In the case of this configuration, the signal processing units 10 and 20 can be configured in various ways with variations also in the number and the layout of the microphones 30 in the first group and the number and the layout of the microphones 40 in the second group, for example.

In addition, in order for the signal processing unit 10 to generate the positive signals (positive electrode terminal signals) and supply the positive signals to the positive electrode terminals of the respective speakers 50 and 60, the signal processing unit 10 is configured to operate independently.

Moreover, in order for the signal processing unit 20 to generate the negative signals (negative electrode terminal signals) and supply the negative signals to the negative electrode terminals of the respective speakers 50 and 60, the signal processing unit 20 has such a configuration as to enhance or change the function of the signal processing unit 10. Note that only the signal processing unit 20 may independently operate depending on cases.

In the configurations according to the second to eighth embodiments, the switching operation can be performed to connect the negative electrode terminals of the speakers 50 and 60 to the ground.

In a state where the respective negative electrode terminals of the speakers 50 and 60 are connected to the ground, each of the speakers 50 and 60 performs acoustic output according to only positive signals. In this case, the function of the signal processing unit 20 can be turned off. Specifically, it is possible to operate both the signal processing units 10 and 20 or operate only the signal processing unit 10 according to situations. This makes it possible to reduce the power consumption, elongate the acoustic output time, and perform the desired acoustic output switching according to situations, for example.

Switching between the state where negative signals are supplied from the signal processing unit 20 to the respective negative electrode terminals of the speakers 50 and 60 and the state where the respective negative electrode terminals are connected to the ground is assumed to be performed according to a manual operation made by the user, by automatic control, by control via communication, and the like.

According to the examples described in the fourth and eighth embodiments, the control unit (CPU 70 or communication control unit 72) is provided to control the switching between the state where negative signals are supplied from the signal processing unit 20 to the respective negative electrode terminals of the speakers 50 and 60 and the state where the respective negative electrode terminals are connected to the ground.

In this manner, switching between the state where the signal processing units 10 and 20 are operated and the state where only the signal processing unit 10 is operated can be executed automatically according to situations or executed according to an operation (including remote operation). This makes it possible to reduce the power consumption, elongate the acoustic output time, and perform the desired acoustic output switching according to situations, for example.

According to the fourth and eighth embodiments, the control unit (CPU 70 or communication control unit 72) controls the signal processing unit 20 to power it off in a case where the negative electrode terminals of the speakers 50 and 60 are connected to the ground.

In this manner, particularly a power saving effect and an acoustic output time elongation effect can be obtained. For example, in a case where the signal processing unit 20 has a function of generating NC signals as in the fourth embodiment, a power consumption reduction effect can be obtained without giving discomfort of noise to the user even in the power-off state of the signal processing unit 20 in a quiet environment.

Note that the power-off state may be a complete power-off state or a state where power supply to main processing is cut off, such as a sleep state of the signal processing unit 20.

According to the example described in the fourth embodiment, the control unit (CPU 70) receives, as input, input audio signals generated by the group of microphones 30 and supplied from the signal processing unit 10, analyzes the audio signals, and controls the signal processing unit 20 according to an analysis result.

The signal processing unit 10 receives, as input, the audio signals from the group of the microphones 30. Thus, the CPU 70 is capable of constantly detecting and analyzing the input audio signals, for example.

Accordingly, the NC function can automatically be enhanced or made unnecessary according to a peripheral-noise status by determining the noise status through a noise analysis or the like and performing on/off control of the signal processing unit 20 and switching control between the negative signal supply and the ground connection. In other words, the signal processing unit 20 can operate at an appropriate timing.

According to the example described in the eighth embodiment, the control unit (communication control unit 72) controls the signal processing unit 20 on the basis of information acquired through communication with the terminal device 90 which is an external device.

For example, the communication control unit 72 can acquire operation information and control information through communication with the terminal device 90. Thereafter, the communication control unit 72 controls the signal processing unit 20 according to the received information. In this manner, remote control using the terminal device 90 or the like can be performed. Moreover, the signal processing unit 20 can be controlled according to determination of the peripheral environment state, the noise state, the current position, the state of the acoustic output device 1, the user status, or the like, the determination being made by using a resource of the terminal device 90. Accordingly, control can be performed to achieve a desirable operation state without increasing a processing load on the acoustic output device 1 side.

Note that the terminal device 90 which is an external device is not limited to a smartphone and is assumed to be a personal computer, a cellular phone, a tablet terminal, a remote controller, or other various types of devices.

According to the first to sixth embodiments, the signal processing unit 10 includes the first acoustic signal generation unit 15 which generates a first positive signal to be supplied to the positive electrode terminal of the speaker 50 and the second acoustic signal generation unit 16 which generates a second positive signal to be supplied to the positive electrode terminal of the speaker 60. The signal processing unit 20 includes the third acoustic signal generation unit 25 which generates a first negative signal to be supplied to the negative electrode terminal of the speaker 50 and the fourth acoustic signal generation unit 26 which generates a second negative signal to be supplied to the negative electrode terminal of the speaker 60.

With this, for example, appropriate acoustic output from the L-channel and R-channel speakers 50 and 60 can be performed.

For example, in a case of generation of positive signals as NC signals, the signal processing unit 10 can supply NC signals based on the microphones on the L-channel side (30FL, 30BL1, 30BL2) to the speaker 50 for the L channel, and supply NC signals based on the microphones on the R-channel side (30FR, 30BR1, 30BR2) to the speaker 60 for the R channel.

Similarly, in a case of generation of negative signals as NC signals, the signal processing unit 20 can supply NC signals based on the microphones on the L-channel side (40BL1, 40BL2, 40BL3) to the speaker 50 for the L channel, and supply NC signals based on the microphones on the R-channel side (40BR1, 40BR2, 40BR3) to the speaker 60 for the R channel.

In other words, the signal processing units 10 and 20 can supply appropriate signals to the respective L and R channels.

Note that it is conceivable as a modification that the signal processing unit 10 divides a positive signal generated by one acoustic signal processing unit into two signals and supplies the divided signals to the positive electrode terminals of the speakers 50 and 60.

Similarly, it is also conceivable that the signal processing unit 20 divides a negative signal generated by one acoustic signal processing unit into two signals and supplies the divided signals to the negative electrode terminals of the speakers 50 and 60.

According to the examples described in the third to seventh embodiments, either one or both of the signal processing units 10 and 20 include the acoustic signal generation units (15, 16, 25, 26) for generating NC signals. For example, the NC signal generation units 15A, 16A, 25A, 26A, and the like and the NC+BF signal generation units 15B and 16B are provided.

With this, an NC system which uses an acoustic processing device including the signal processing units 10 and 20 can be constructed. In addition, switching between the case where both the signal processing units 10 and 20 are operated and the case where only the signal processing unit 10 is operated can be performed in the NC system.

According to the examples described in the sixth to eighth embodiments, either one or both of the signal processing units 10 and 20 include the acoustic signal generation units (15, 16, 25, 26) for generating BF signals. For example, the NC+BF signal generation units 15B and 16B and the BF signal generation units 25B and 26B are provided.

In this manner, a BF system which uses an acoustic processing device including the signal processing units 10 and 20 can be constructed. In addition, switching between the case where both the signal processing units 10 and 20 are operated and the case where only the signal processing unit 10 is operated can be performed in the BF system.

According to the examples described in the first to seventh embodiments, positive signals generated by the signal processing unit 10 are signals obtained by synthesizing the acoustic signals generated by the acoustic signal generation units (15, 16) of the signal processing unit 10, with the input acoustic signals (SL, SR).

Accordingly, the signal processing unit 10 generates positive signals by synthesizing the input acoustic signals SL and SR of music or the like with the acoustic signals (e.g., NC signals and BF signals) generated in the signal processing unit 10. For example, the NC processing and the BF processing can thus be implemented in a music reproduction system. In this case, appropriate operations can be performed by switching of the signal processing units 10 and 20.

Note that it is also conceivable that the signal processing unit 20 generates negative signals by synthesizing the input acoustic signals SL and SR of music or the like with acoustic signals (e.g., NC signals and BF signals) generated in the signal processing unit 20.

According to the examples described in the first to sixth embodiments, positive signals generated by the signal processing unit 10 and negative signals generated by the signal processing unit 20 contain signal components with the same acoustic function.

For example, assumed is such an example where the signal processing units 10 and 20 both generate NC signals such that positive signals and negative signals contain NC signal components (or BF signal components). In this case, when the signal processing unit 20 is turned on or off, switching between emphasis and emphasis cancelling of the functions of the signal components (e.g., NC function and BF function) can be performed.

According to the example described in the sixth embodiment, either positive signals generated by the signal processing unit 10 or negative signals generated by the signal processing unit 20 contain signal components for a particular acoustic function.

According to the sixth embodiment, for example, signal components of NC signals are contained only in positive signals. Specifically, the signal processing unit 10 generates NC signals and BF signals, and positive signals contain NC signal components and BF signal components. On the other hand, the signal processing unit 20 generates BF signals, and negative signals contain BF signal components (and not contain NC signal components).

In such a manner, positive signals and negative signals contain signals with different acoustic functions. Accordingly, the signals are selectively used in various ways. In the case of the sixth embodiment, the signals are selectively used depending on a case where only the NC function is desired to be used and a case where both the NC function and the BF function are desired to be used.

Moreover, as a modification of the configuration of the sixth embodiment, assumed is such an example where the positive electrode terminals of the speakers 50 and 60 are connected to the ground with the signal processing unit 10 powered off. In this case, switching between on and off of the NC function can be performed according to situations.

Moreover, while not depicted in the figures, if the signal processing unit 10 generates positive signals containing NC signal components and the signal processing unit 20 generates negative signals containing particular-frequency emphasis signal components, switching between on and off of the particular-frequency emphasis function can be performed according to on/off operation of the signal processing unit 20, for example.

As described in these examples, with the use of positive signals and negative signals containing signals with different acoustic functions, the signal processing units 10 and 20 are operated according to a necessary function, and thus, the functions can selectively be implemented, or switching between simultaneous operation and partial operation can be performed.

In the respective embodiments, the acoustic output device 1 including the speakers 50 and 60 has been described.

With headphones or earphones which include built-in components of the signal processing units 10 and 20, it is possible to provide headphones or earphones useful for a user.

Further, the acoustic output device 1 which includes the first group of microphones 30 and the second group of microphones 40 has been described in the respective embodiments.

The signal processing units 10 and 20 which have the microphones 30 and 40 and are configured to process audio signals of sounds collected by the microphones 30 and 40 can perform appropriate processing according to the particular positions of the microphones, the number of the microphones, or the like. In other words, when the signal processing units 10 and 20 integrally include an appropriate number of the microphones 30 and 40, which are required for processing by the signal processing units 10 and 20, or include the microphones 30 and 40 which are arranged in an appropriate layout, more appropriate effects of acoustic functions using positive signals and negative signals generated by the signal processing units 10 and 20 can be produced.

According to the example described in the eighth embodiment, the terminal device 90 is an information processing device capable of communicating with the acoustic output device 1 (acoustic processing device) and performs the transmission process (S112) of transmitting a signal for controlling the signal processing unit 20 to the acoustic output device 1 on the basis of the status determination process (S110) and a result of the status determination process.

In this manner, the operation state of the acoustic output device 1 can automatically be controlled on the basis of determination of the peripheral environment state, the noise state, the current position, the state of the acoustic output device 1, the user status, or the like. Moreover, the acoustic output device 1 is not required to have a resource for the determination process.

For example, a program according to an embodiment is a program which causes a CPU, a DSP, or the like included in an information processing device capable of communicating with an acoustic processing device, or a device including any of these to execute the process described in FIG. 16.

Specifically, the program according to the embodiment is a program which causes execution of a status determination process and a transmission process of transmitting a signal for controlling the signal processing unit 20 to the acoustic output device 1, on the basis of a result of the status determination process. The terminal device 90 described above can be constructed with the use of the foregoing program.

Such a program can be recorded beforehand in an HDD as a recording medium built in a device such as the terminal device 90, a ROM in a microcomputer having a CPU, or the like.

Alternatively, the program can temporarily or permanently be stored (recorded) in a removable recording medium such as a flexible disk, a CD-ROM (Compact Disc Read Only Memory), a MO (Magneto Optical) disk, a DVD (Digital Versatile Disc), a Blu-ray disc (registered trademark), a magnetic disk, a semiconductor memory, and a memory card. Such a removable recording medium can be provided as what is called package software.

Alternatively, such a program described above can be installed from the removable recording medium into a personal computer or the like or can be downloaded from a download site via a network such as a LAN (Local Area Network) and the Internet.

In addition, such a program described above is suited for providing the terminal device 90 of the embodiment in a wide range. For example, a portable terminal device such as a smartphone and a tablet, a cellular phone, a personal computer, a game console, a video device, a PDA (Personal Digital Assistant), or the like can function as the terminal device 90 of the present disclosure by downloading the program into these devices.

The acoustic processing device (acoustic output device 1 itself, a built-in device of the acoustic output device 1, or a separate device) of the embodiments is not limited to a device such as headphones and earphones for reproduction of music or the like, for example, and can be constructed as headphones or earphones for calls, a sound collector, a hearing aid, or the like.

Moreover, the acoustic processing device of the embodiments is not limited to wearable headphones or earphones and can be applied to a stationary type speaker system.

Note that advantageous effects to be obtained are not limited to the advantageous effects described in the present description and presented only by way of example. Other advantageous effects may be produced.

Note that the present technology may also have the following configurations.

(1)

An acoustic processing device including:

a first signal processing unit that generates a positive signal to be supplied to a positive electrode terminal of a first speaker and a positive electrode terminal of a second speaker, by using input audio signals from a first group of microphones; and a second signal processing unit that generates a negative signal to be supplied to a negative electrode terminal of the first speaker and a negative electrode terminal of the second speaker, by using input audio signals from a second group of microphones.

(2)

The acoustic processing device according to (1) described above, in which switching between a state where the negative signal is supplied to the negative electrode terminal of the first speaker and the negative electrode terminal of the second speaker and a state where the negative electrode terminal of the first speaker and the negative electrode terminal of the second speaker are connected to a ground is enabled.

(3)

The acoustic processing device according to (1) or (2) described above, in which switching between the state where the negative signal is supplied to the negative electrode terminal of the first speaker and the negative electrode terminal of the second speaker and the state where the negative electrode terminal of the first speaker and the negative electrode terminal of the second speaker are connected to a ground is enabled, and the acoustic processing device includes a control unit that controls the switching.

(4)

The acoustic processing device according to (3) described above, in which the control unit controls the second signal processing unit to power it off in a case where the negative electrode terminal of the first speaker and the negative electrode terminal of the second speaker are connected to the ground.

(5)

The acoustic processing device according to (3) or (4) described above, in which the control unit receives, as input, the input audio signals from the first group of microphones through the first signal processing unit, analyzes the audio signals, and controls the second signal processing unit according to an analysis result.

(6)

The acoustic processing device according to any one of (3) to (5) described above, in which the control unit controls the second signal processing unit on the basis of information acquired through communication with an external device.

(7)

The acoustic processing device according to any one of (1) to (6) described above, in which the first signal processing unit includes a first acoustic signal generation unit that generates a first positive signal to be supplied to the positive electrode terminal of the first speaker, and a second acoustic signal generation unit that generates a second positive signal to be supplied to the positive electrode terminal of the second speaker, and the second signal processing unit includes a third acoustic signal generation unit that generates a first negative signal to be supplied to the negative electrode terminal of the first speaker, and a fourth acoustic signal generation unit that generates a second negative signal to be supplied to the negative electrode terminal of the second speaker.

(8)

The acoustic processing device according to any one of (1) to (7) described above, in which one of or both the first signal processing unit and the second signal processing unit include an acoustic signal generation unit that generates a noise-cancelling signal.

(9)

The acoustic processing device according to any one of (1) to (8) described above, in which one of or both the first signal processing unit and the second signal processing unit include an acoustic signal generation unit that generates a beam forming signal.

(10)

The acoustic processing device according to any one of (1) to (9) described above, in which the positive signal generated by the first signal processing unit is a signal obtained by synthesizing an acoustic signal generated by an acoustic signal generation unit of the first signal processing unit, with an acoustic signal input to the first signal processing unit.

(11)

The acoustic processing device according to any one of (1) to (10) described above, in which the positive signal generated by the first signal processing unit and the negative signal generated by the second signal processing unit contain signal components having an identical acoustic function.

(12)

The acoustic processing device according to any one of (1) to (11) described above, in which either the positive signal generated by the first signal processing unit or the negative signal generated by the second signal processing unit contains a signal component for a particular acoustic function.

(13)

The acoustic processing device according to any one of (1) to (12) described above, including:

the first speaker and the second speaker.

(14)

The acoustic processing device according to any one of (1) to (13) described above, including:

the first group of microphones and the second group of microphones.

(15)

An acoustic processing method comprising:

a first signal process of generating a positive signal to be supplied to a positive electrode terminal of a first speaker and a positive electrode terminal of a second speaker, by using input audio signals from a first group of microphones; and a second signal process of generating a negative signal to be supplied to a negative electrode terminal of the first speaker and a negative electrode terminal of the second speaker, by using input audio signals from a second group of microphones.

(16)

A control method performed by an information processing device capable of communicating with an acoustic processing device, the acoustic processing device including a first signal processing unit that generates a positive signal to be supplied to a positive electrode terminal of a first speaker and a positive electrode terminal of a second speaker, by using input audio signals from a first group of microphones, and a second signal processing unit that generates a negative signal to be supplied to a negative electrode terminal of the first speaker and a negative electrode terminal of the second speaker, by using input audio signals from a second group of microphones, the control method including:

a status determination process; and a transmission process of transmitting a signal for controlling the second signal processing unit to the acoustic processing device, on the basis of a result of the status determination process.

(17)

A program for an information processing device capable of communicating with an acoustic processing device, the acoustic processing device including a first signal processing unit that generates a positive signal to be supplied to a positive electrode terminal of a first speaker and a positive electrode terminal of a second speaker, by using input audio signals from a first group of microphones, and a second signal processing unit that generates a negative signal to be supplied to a negative electrode terminal of the first speaker and a negative electrode terminal of the second speaker, by using input audio signals from a second group of microphones, the program causing the information processing device to perform:

a status determination process; and a transmission process of transmitting a signal for controlling the second signal processing unit to the acoustic processing device, on the basis of a result of the status determination process.

While the positive electrode terminals, the positive signal supplied to the positive electrode terminals, the negative electrode terminals, and the negative signal supplied to the negative electrode terminals have been clarified in the above description, the relation between the positive electrodes and the negative electrodes may be opposite to the relation described in all of the above description. Accordingly, a technology having a first electrode terminal, a second electrode terminal, a first signal, and a second signal can be provided as described in the following configurations (101) to (117).

For example, in a case where, in (101) to (117) described below, the “first electrode terminal” is the positive electrode terminal, the “first signal” is the positive signal, the “second electrode terminal” is the negative electrode terminal, and the “second signal” is the negative signal, configurations according to (101) to (117) are similar to those according to (1) to (17) described above. Meanwhile, it is also conceivable that the “first electrode terminal” is the negative electrode terminal, the “first signal” is the negative signal, the “second electrode terminal” is the positive electrode terminal, and the “second signal” is the positive signal. Even in this case, advantageous effects similar to those described in the embodiments can also be obtained.

(101)

An acoustic processing device including:

a first signal processing unit that generates a first signal to be supplied to a first electrode terminal of a first speaker and a first electrode terminal of a second speaker, by using input audio signals from a first group of microphones; and a second signal processing unit that generates a second signal to be supplied to a second electrode terminal of the first speaker and a second electrode terminal of the second speaker, by using input audio signals from a second group of microphones.

(102)

The acoustic processing device according to (101) described above, in which switching between a state where the second signal is supplied to the second electrode terminal of the first speaker and the second electrode terminal of the second speaker and a state where the second electrode terminal of the first speaker and the second electrode terminal of the second speaker are connected to a ground is enabled.

(103)

The acoustic processing device according to (101) or (102) described above, in which switching between the state where the second signal is supplied to the second electrode terminal of the first speaker and the second electrode terminal of the second speaker and the state where the second electrode terminal of the first speaker and the second electrode terminal of the second speaker are connected to a ground is enabled, and the acoustic processing device includes a control unit that controls the switching.

(104)

The acoustic processing device according to (103) described above, in which the control unit controls the second signal processing unit to power it off in a case where the second electrode terminal of the first speaker and the second electrode terminal of the second speaker are connected to the ground.

(105)

The acoustic processing device according to (103) or (104) described above, in which the control unit receives, as input, the input audio signals from the first group of microphones through the first signal processing unit, analyzes the audio signals, and controls the second signal processing unit according to an analysis result.

(106)

The acoustic processing device according to any one of (103) to (105) described above, in which the control unit controls the second signal processing unit on the basis of information acquired through communication with an external device.

(107)

The acoustic processing device according to any one of (101) to (106) described above, in which the first signal processing unit includes a first acoustic signal generation unit that generates a primary first signal to be supplied to the first electrode terminal of the first speaker, and a second acoustic signal generation unit that generates a secondary first signal to be supplied to the first electrode terminal of the second speaker, and the second signal processing unit includes a third acoustic signal generation unit that generates a primary second signal to be supplied to the second electrode terminal of the first speaker, and a fourth acoustic signal generation unit that generates a secondary second signal to be supplied to the second electrode terminal of the second speaker.

(108)

The acoustic processing device according to any one of (101) to (107) described above, in which one of or both the first signal processing unit and the second signal processing unit include an acoustic signal generation unit that generates a noise-cancelling signal.

(109)

The acoustic processing device according to any one of (101) to (108) described above, in which one of or both the first signal processing unit and the second signal processing unit include an acoustic signal generation unit that generates a beam forming signal.

(110)

The acoustic processing device according to any one of (101) to (109) described above, in which the first signal generated by the first signal processing unit is a signal obtained by synthesizing an acoustic signal generated by an acoustic signal generation unit of the first signal processing unit, with an acoustic signal input to the first signal processing unit.

(111)

The acoustic processing device according to any one of (101) to (110) described above, in which the first signal generated by the first signal processing unit and the second signal generated by the second signal processing unit contain signal components having an identical acoustic function.

(112)

The acoustic processing device according to any one of (101) to (111) described above, in which either the first signal generated by the first signal processing unit or the second signal generated by the second signal processing unit contains a signal component for a particular acoustic function.

(113)

The acoustic processing device according to any one of (101) to (112) described above, including:

the first speaker and the second speaker.

(114)

The acoustic processing device according to any one of (101) to (113) described above, including:

the first group of microphones and the second group of microphones.

(115)

An acoustic processing method including:

a first signal process of generating a first signal to be supplied to a first electrode terminal of a first speaker and a first electrode terminal of a second speaker, by using input audio signals from a first group of microphones; and a second signal process of generating a second signal to be supplied to a second electrode terminal of the first speaker and a second electrode terminal of the second speaker, by using input audio signals from a second group of microphones.

(116)

A control method performed by an information processing device capable of communicating with an acoustic processing device, the acoustic processing device including a first signal processing unit that generates a first signal to be supplied to a first electrode terminal of a first speaker and a first electrode terminal of a second speaker, by using input audio signals from a first group of microphones, and a second signal processing unit that generates a second signal to be supplied to a second electrode terminal of the first speaker and a second electrode terminal of the second speaker, by using input audio signals from a second group of microphones, the control method including:

a status determination process; and a transmission process of transmitting a signal for controlling the second signal processing unit to the acoustic processing device, on the basis of a result of the status determination process.

(117)

A program for an information processing device capable of communicating with an acoustic processing device, the acoustic processing device including a first signal processing unit that generates a first signal to be supplied to a first electrode terminal of a first speaker and a first electrode terminal of a second speaker, by using input audio signals from a first group of microphones, and a second signal processing unit that generates a second signal to be supplied to a second electrode terminal of the first speaker and a second electrode terminal of the second speaker, by using input audio signals from a second group of microphones, the program causing the information processing device to perform:

a status determination process; and a transmission process of transmitting a signal for controlling the second signal processing unit to the acoustic processing device, on the basis of a result of the status determination process.

REFERENCE SIGNS LIST

1: Acoustic output device
1A, 1B: Headphones
1C, 1D: Earphones
5L: Left housing
5R: Right housing
10, 10A, 10B, 10C: Signal processing unit
15, 15C, 16, 25, 25C, 26: Acoustic signal generation unit
15A, 15A1, 15A2, 25A, 25A1, 25A2: NC signal generation unit
16A, 16A1, 16A2, 26A, 26A1, 26A2: NC signal generation unit
15B, 16B: NC+BF signal generation unit
25B, 26B: BF signal generation unit
20, 20A, 20B, 20C: Signal processing unit
27L, 27R: Switch unit
30, 40: Microphone
50, 60: Speaker
70: CPU
71: Noise analysis unit
72: Communication control unit
90: Terminal device

The invention claimed is:

1. An acoustic processing device comprising:

a first signal processing unit that generates a positive signal to be supplied to a positive electrode terminal of a first speaker and a positive electrode terminal of a second speaker, by using input audio signals from a first group of microphones; and a second signal processing unit that generates a negative signal to be supplied to a negative electrode terminal of the first speaker and a negative electrode terminal of the second speaker, by using input audio signals from a second group of microphones.

2. The acoustic processing device according to claim 1, wherein switching between a state where the negative signal is supplied to the negative electrode terminal of the first speaker and the negative electrode terminal of the second speaker and a state where the negative electrode terminal of the first speaker and the negative electrode terminal of the second speaker are connected to a ground is enabled.

3. The acoustic processing device according to claim 1, wherein switching between a state where the negative signal is supplied to the negative electrode terminal of the first speaker and the negative electrode terminal of the second speaker and a state where the negative electrode terminal of the first speaker and the negative electrode terminal of the second speaker are connected to a ground is enabled, and the acoustic processing device includes a control unit that controls the switching.

4. The acoustic processing device according to claim 3, wherein the control unit controls the second signal processing unit to power it off in a case where the negative electrode terminal of the first speaker and the negative electrode terminal of the second speaker are connected to the ground.

5. The acoustic processing device according to claim 3, wherein the control unit receives, as input, the input audio signals from the first group of microphones through the first signal processing unit, analyzes the audio signals, and controls the second signal processing unit according to an analysis result.

6. The acoustic processing device according to claim 3, wherein the control unit controls the second signal processing unit on a basis of information acquired through communication with an external device.

7. The acoustic processing device according to claim 1, wherein the first signal processing unit includes a first acoustic signal generation unit that generates a first positive signal to be supplied to the positive electrode terminal of the first speaker, and a second acoustic signal generation unit that generates a second positive signal to be supplied to the positive electrode terminal of the second speaker, and the second signal processing unit includes a third acoustic signal generation unit that generates a first negative signal to be supplied to the negative electrode terminal of the first speaker, and a fourth acoustic signal generation unit that generates a second negative signal to be supplied to the negative electrode terminal of the second speaker.

8. The acoustic processing device according to claim 1, wherein one of or both the first signal processing unit and the second signal processing unit include an acoustic signal generation unit that generates a noise-cancelling signal.

9. The acoustic processing device according to claim 1, wherein one of or both the first signal processing unit and the second signal processing unit include an acoustic signal generation unit that generates a beam forming signal.

10. The acoustic processing device according to claim 1, wherein the positive signal generated by the first signal processing unit is a signal obtained by synthesizing an acoustic signal generated by an acoustic signal generation unit of the first signal processing unit, with an acoustic signal input to the first signal processing unit.

11. The acoustic processing device according to claim 1, wherein the positive signal generated by the first signal processing unit and the negative signal generated by the second signal processing unit contain signal components having an identical acoustic function.

12. The acoustic processing device according to claim 1, wherein either the positive signal generated by the first signal processing unit or the negative signal generated by the second signal processing unit contains a signal component for a particular acoustic function.

13. The acoustic processing device according to claim 1, comprising: the first speaker and the second speaker.

14. The acoustic processing device according to claim 1, comprising: the first group of microphones and the second group of microphones.

15. An acoustic processing method comprising: a first signal process of generating a positive signal to be supplied to a positive electrode terminal of a first speaker and a positive electrode terminal of a second speaker, by using input audio signals from a first group of microphones; and a second signal process of generating a negative signal to be supplied to a negative electrode terminal of the first speaker and a negative electrode terminal of the second speaker, by using input audio signals from a second group of microphones.

16. A control method performed by an information processing device capable of communicating with an acoustic processing device, the acoustic processing device including a first signal processing unit that generates a positive signal to be supplied to a positive electrode terminal of a first speaker and a positive electrode terminal of a second speaker, by using input audio signals from a first group of microphones, and a second signal processing unit that generates a negative signal to be supplied to a negative electrode terminal of the first speaker and a negative electrode terminal of the second speaker, by using input audio signals from a second group of microphones, the control method comprising: a status determination process; and a transmission process of transmitting a signal for controlling the second signal processing unit of the acoustic processing device, on a basis of a result of the status determination process.

17. A non-transitory computer-readable medium storing a program that, when processed by a processor, implements an information processing device communicating with an acoustic processing device, the acoustic processing device including a first signal processing unit that generates a positive signal to be supplied to a positive electrode terminal of a first speaker and a positive electrode terminal of a second speaker, by using input audio signals from a first group of microphones, and a second signal processing unit that generates a negative signal to be supplied to a negative electrode terminal of the first speaker and a negative electrode terminal of the second speaker, by using input audio signals from a second group of microphones, processing of the program causing the information processing device to perform: a status determination process; and a transmission process of transmitting a signal for controlling the second signal processing unit of the acoustic processing device, on a basis of a result of the status determination process.

* * * * *